(12) United States Patent
Sato et al.

(10) Patent No.: US 7,618,511 B2
(45) Date of Patent: Nov. 17, 2009

(54) SCINTILLATOR PANEL AND METHOD OF MANUFACTURING RADIATION IMAGE SENSOR

(75) Inventors: Hiroto Sato, Hamamatsu (JP);
Takaharu Suzuki, Hamamatsu (JP);
Masahiro Suganuma, Hamamatsu (JP)

(73) Assignee: Hamamatsu Photonics K.K., Hamamatsu-shi, Shizuoka (JP)

( * ) Notice: Subject to any disclaimer, the term of this patent is extended or adjusted under 35 U.S.C. 154(b) by 302 days.

(21) Appl. No.: 10/547,780

(22) PCT Filed: Mar. 5, 2004

(86) PCT No.: PCT/JP2004/002871

§ 371 (c)(1),
(2), (4) Date: Jul. 13, 2006

(87) PCT Pub. No.: WO2004/079396

PCT Pub. Date: Sep. 16, 2004

(65) Prior Publication Data

US 2006/0263521 A1      Nov. 23, 2006

(30) Foreign Application Priority Data

Mar. 7, 2003    (JP)    ............................. 2003-062308
Mar. 7, 2003    (JP)    ............................. 2003-062321

(51) Int. Cl.
*B31D 1/02*    (2006.01)
*B32B 37/18*   (2006.01)
*B32B 38/04*   (2006.01)
*B32B 38/10*   (2006.01)
*G01J 1/58*    (2006.01)
*G01T 7/02*    (2006.01)

(52) U.S. Cl. .................. 156/248; 156/249; 156/250; 156/278; 250/483.1; 250/484.4

(58) Field of Classification Search ......... 156/248–250, 156/253, 254, 278; 250/361 R, 362, 370.08, 250/370.09, 370.11, 472.1, 473.1, 482.2, 250/484.2, 484.4, 483.1
See application file for complete search history.

(56) References Cited

U.S. PATENT DOCUMENTS

| | | | | |
|---|---|---|---|---|
| 5,334,842 | A | * 8/1994 | Van Havenbergh et al. ...... | 250/483.1 |
| 5,368,882 | A | * 11/1994 | Tran et al. ..................... | 427/65 |
| 6,262,422 | B1 | 7/2001 | Homme et al. ......... | 250/370.11 |
| 6,278,118 | B1 | 8/2001 | Homme et al. ......... | 250/370.11 |
| 6,531,225 | B1 | 3/2003 | Homme et al. ............. | 428/408 |

(Continued)

FOREIGN PATENT DOCUMENTS

EP         522609 A1 *  1/1993

(Continued)

*Primary Examiner*—Philip C Tucker
*Assistant Examiner*—Sing P Chan
(74) *Attorney, Agent, or Firm*—Drinker Biddle & Reath LLP

(57) ABSTRACT

An auxiliary substrate 20 is overlapped onto a thin substrate 11, and substrate 11 and auxiliary substrate 20 are covered with an organic film 12. Thereafter, a scintillator 13 is formed on a scintillator forming portion 12A of organic film 12 that corresponds to substrate 11. Here, since thickness is added to substrate 11 by auxiliary substrate 20, the warping of substrate 11 is prevented and scintillator 13 is formed uniformly.

19 Claims, 33 Drawing Sheets

U.S. PATENT DOCUMENTS

| | | | |
|---|---|---|---|
| 2001/0023924 A1* | 9/2001 | Takabayashi et al. | 250/361 R |
| 2001/0030291 A1 | 10/2001 | Homme et al. | 250/483.1 |
| 2003/0001101 A1 | 1/2003 | Homme et al. | 250/370.11 |

FOREIGN PATENT DOCUMENTS

| | | | |
|---|---|---|---|
| JP | 3034010 B2 | 2/2000 | |
| JP | 3126715 B2 | 11/2000 | |
| JP | 2002/022896 | 1/2002 | |
| JP | 2002/277998 | 9/2002 | |
| WO | WO 98/36290 | 8/1998 | |
| WO | WO 98/36291 | 8/1998 | |
| WO | WO 01/88567 A1 * | 11/2001 | |

* cited by examiner

SCINTILLATOR PANEL AND METHOD OF MANUFACTURING RADIATION IMAGE SENSOR

TECHNICAL FIELD

This invention relates to a scintillator panel and a radiation image sensor for X-ray image taking for medical and industrial applications, etc., and a manufacturing method of the same.

BACKGROUND ART

Conventionally X-ray sensitive films have been used for medical or industrial X-ray image taking, but the use of radiation imaging systems using radiation image sensors is spreading due to the aspects of convenience and preservation of the image taking results. With such a radiation imaging system, a radiation image is acquired as two-dimensionally arrayed pixel data in the form of electrical signals by means of a radiation image sensor, and the signals are processed by a processing device and displayed on a monitor. A scintillator panel, in which a scintillator is formed by vapor depositing scintillator components onto a substrate of aluminum, glass, or fused silica, etc., is used in the radiation image sensor, and such a scintillator panel is disclosed, for example, in Japanese Patent No. 3,126,715 and No. 3,034,010.

To describe a conventional manufacturing method of this type of scintillator panel with reference to FIG. 38A, a substrate 61 is inserted inside a vacuum vapor deposition device and end portions of substrate 61 are set on a holding jig 70, 70, disposed in the vacuum vapor deposition device. Here, a scintillator vapor deposition surface 61A of substrate 61 is positioned at the lower side. When substrate 61 has been set inside the vacuum vapor deposition device by means of holding jig 70, 70, scintillator materials are vapor deposited onto scintillator vapor deposition surface 61A of substrate 61 to form a scintillator 62. A scintillator panel 60, with which scintillator 62 is formed on scintillator vapor deposition surface 61A, is thereby manufactured as shown in FIG. 38B.

DISCLOSURE OF THE INVENTION

With increasing range of radiation image sensors spreading into new territories in recent years, slimming down of the substrate, enlarging the scintillator forming surface, etc., are being demanded.

For example, for improving the radiation transmittance at low energies, slimming down of the substrate is desired. However, in an attempt to manufacture a scintillator panel with a thin substrate by the above-described conventional method, the substrate becomes warped by its own weight when end portions of the substrate are placed on the holding jig and there will be a problem that scintillator cannot be vapor deposited uniformly. This problem tends to occur especially when a substrate of large area is used. Unlike a visible light image, a radiation image cannot be reduced in size using an optical system, and the above problem tends to occur readily since a scintillator panel of a large area in the excess of 30 centimeters square is required, for example, in chest X-ray image taking.

Meanwhile, a scintillator panel, for a radiation image sensor for dental use that is used by inserting inside an oral cavity, must be made as compact as possible and yet made large in image pickup area.

However, with the above-described conventional manufacturing method, the end portions of scintillator vapor deposition surface 61A are held by holding jig 70 of the vacuum vapor deposition device in the process of forming scintillator 62. Thus the entire surface of the scintillator vapor deposition surface 61A is not necessarily exposed, and scintillator 62 is not formed at the end portions that are not exposed. As a result, the area of surface 62A of scintillator 62 becomes small relative to the area of scintillator vapor deposition surface 61A of substrate 61, and the image pickup area becomes small in comparison to the entire area.

Also, since holding jig 70 is positioned at the end portions of scintillator vapor deposition surface 61A, the surface of scintillator 62 is formed in an inclining slope-like manner at the end portions. Thus for example, when an adhesive agent is used to adhere an image pickup element to scintillator 62 across an organic film in order to manufacture an imaging panel, the adhesive agent concentrates at the slope-like portions and distortion occurs when the adhesive agent solidifies.

Therefore, it is an object of the present invention to provide a manufacturing method of a scintillator panel and a radiation image sensor, with which the slimming down of the substrate and enlarging the area proportion of the scintillator forming surface on the substrate are facilitated.

In order to achieve the above object, a manufacturing method of a scintillator panel according to the present invention is characterized in a manufacturing method of a scintillator panel, wherein a scintillator is vapor deposited onto a substrate, comprising the steps of: (1) overlapping an auxiliary substrate onto a predetermined position of a first surface of the substrate; (2) collectively covering the entire overlapped substrate and auxiliary substrate with an organic film; (3) holding the substrate and the auxiliary substrate, which are covered by the organic film, by means of a holding portion inside a vapor deposition device; (4) vapor depositing the scintillator onto a surface of the organic film that covers a second surface of the substrate at the side opposite the first surface in this state; and (5) cutting the organic film at predetermined positions and separating the substrate from the auxiliary substrate to provide a scintillator panel, with which the organic film and the scintillator are formed on the second surface of the substrate.

With the manufacturing method for the scintillator panel according to the present invention, an auxiliary substrate is overlapped onto a substrate in forming a scintillator on the substrate. Since the auxiliary substrate is overlapped onto the substrate, warping of the substrate due to its own weight or the weight of the scintillator can be prevented in forming the scintillator. The warping of the substrate is likewise prevented even when the substrate has a large area. The scintillator can thus be formed uniformly on the substrate even when the substrate is thin or large in area.

Also, a manufacturing method of a scintillator panel according to the present invention is characterized in a manufacturing method of a scintillator panel, wherein a scintillator is vapor deposited onto an organic film, comprising the steps of: (1) covering at least a first surface of a predetermined auxiliary substrate with the organic film; (2) holding the auxiliary substrate, covered by the organic film, by means of a holding portion inside a vapor deposition device; (3) vapor depositing the scintillator onto a predetermined position of an exposed surface of the organic film at the side opposite the surface contacting the first surface of the auxiliary substrate in this state; and (4) separating the organic film, on which the scintillator is formed, from the auxiliary substrate.

By thus forming a scintillator on an organic film disposed on an auxiliary substrate and thereafter separating the organic film, on which the scintillator is formed, from the auxiliary substrate, a scintillator panel having the organic film itself as the substrate can be formed. By making thin the organic film provided here, a state wherein the scintillator is formed on a thin substrate can be realized. The same effects as those of the above-described case of manufacturing a scintillator panel by adding an auxiliary substrate to a substrate can be obtained in this case as well.

Preferably, a step of covering the organic film, having the scintillator and being separated from the auxiliary substrate, with a protective film is also included. The scintillator can thereby be prevented from contacting external air and undergoing deliquescence due to the moisture contained in the air and other physical and chemical degradation, damage, etc.

A step of setting and fixing the organic film, having the scintillator and being separated from the auxiliary substrate, on a substrate upon making either the surface, which was in contact with the first surface of the auxiliary substrate, or the scintillator forming surface of the organic film face the substrate may furthermore be provided. By thus setting the scintillator forming surface or the scintillator on a separate substrate, a scintillator panel can be manufactured. By preparing a thin substrate, a thin scintillator panel can be manufactured.

Preferably, a step of forming a protective film that covers the scintillator is furthermore provided. In covering the scintillator with the protective film, it is sufficient that the exposed portions of the scintillator be covered, and just the scintillator may be covered by the protective film or at least one among the scintillator forming portion and the substrate may be covered along with the scintillator by the protective film.

These substrates are preferably radiation transmitting substrates, and as such a radiation transmitting substrate, glass, aluminum, or amorphous carbon may be used. By using a radiation transmitting substrate as the substrate, a scintillator panel of an embodiment wherein radiation is transmitted from the back side of the substrate can be arranged.

A step of forming a metal reflecting film between the substrate and the scintillator may be provided. The luminance of the light emitted from the scintillator can thereby be increased.

A fiber optic plate may be used as the substrate. Light converted from radiation by the scintillator can then be emitted from the substrate with high spatial resolution.

The auxiliary substrate has protruding portions that protrude to the outer sides of the substrate as viewed from the first surface side and is held by the holding portion inside the vapor deposition device by use of these protruding portions. Or, the auxiliary substrate may have protruding portions that protrude in the direction of the substrate thickness and opposite the first surface and be held by the holding portion inside the vapor deposition device by use of these protruding portions. Or, the auxiliary substrate may have engaging portions at side wall portions and be held by the holding portion inside the vapor deposition device by use of these engaging portions.

By thus holding the substrate using the auxiliary substrate, the entire surface of the scintillator forming surface of the substrate can be exposed inside a vapor deposition chamber and a uniform scintillator layer can be formed over the entire forming surface. A scintillator panel, having a scintillator area substantially equal to the substrate area, can thus be prepared. The substrate can be held securely by the auxiliary substrate.

The radiation image sensor according to the present invention is characterized in having a step of mounting the scintillator panel manufactured by the above-described manufacturing method onto a light receiving surface of a solid-state image pickup element.

Specifically, the method comprises the steps of: (1) overlapping an auxiliary substrate onto a predetermined position of a first surface of a substrate; (2) collectively covering an entire the overlapped substrate and the auxiliary substrate with an organic film; (3) holding the substrate and the auxiliary substrate, which are covered by the organic film, by means of a holding portion inside a vapor deposition device; (4) vapor depositing a scintillator on a surface of the organic film that covers a second surface of the substrate at the side opposite the first surface in this state; (5) cutting the organic film at predetermined positions and separating the substrate from the auxiliary substrate to provide a scintillator panel, with which the organic film and the scintillator are formed on the second surface of the substrate; and (6) adhering the scintillator panel onto a light receiving surface of a solid-state image pickup element.

Or, after the steps of (1) to (4), the method may comprise the steps of: (4a) adhering the scintillator forming surface onto a light receiving surface of a solid-state image pickup element; and (5a) cutting the organic film at predetermined positions and separating the substrate from the auxiliary substrate to provide a radiation image sensor, having a scintillator panel positioned on the light receiving surface of the solid-state image pickup element.

Or, the method may comprise the steps of: (1) covering at least a first surface of a predetermined auxiliary substrate with an organic film; (2) holding the auxiliary substrate, covered by the organic film, by means of a holding portion inside a vapor deposition device; (3) vapor depositing a scintillator on a predetermined position of an exposed surface of the organic film at the side opposite the surface contacting the first surface of the auxiliary substrate in this state; (4) separating the organic film, on which the scintillator is formed, from the auxiliary substrate; and (5) mounting the surface at the side opposite the scintillator forming surface or the scintillator forming surface of the organic film with the scintillator onto a light receiving surface of a solid-state image pickup element.

By thus mounting the scintillator, formed on the substrate or the film, onto the solid-state image pickup element, a radiation image sensor, with which the scintillator is formed uniformly on the substrate that is thin or large in area, can be manufactured. For the mounting of the scintillator or the substrate on the light receiving surface of the solid-state image pickup element, besides the embodiment directly mounting the scintillator or the substrate, an embodiment mounting via an organic film or a protective film is also possible. In order to prevent deliquescence, etc., of the scintillator, the scintillator is preferably covered with a protective film, and in this case, the exposed portions of the scintillator are covered. In regard to covering the exposed portions of the scintillator, besides the embodiment covering just the scintillator with the protective film, an embodiment covering at least one among the scintillator forming portion, the substrate, and the solid-state image pickup element along with the scintillator is also possible.

BEST MODES FOR CARRYING OUT THE INVENTION

Figure 1A:
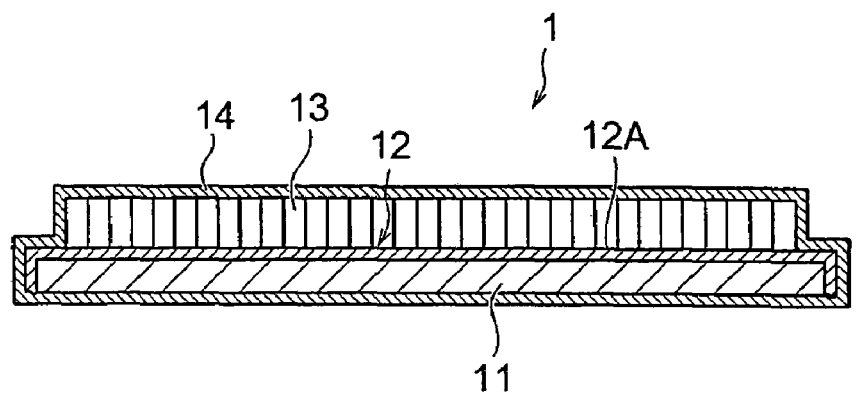
FIG. 1A is a sectional view of a scintillator panel manufactured by a scintillator panel manufacturing method according to a first embodiment of the present invention.

Preferred embodiments of the present invention shall now be described specifically with reference to the drawings. To facilitate the comprehension of the explanation, the same reference numerals denote the same parts, where possible, throughout the drawings, and a repeated explanation will be omitted. Also, to facilitate the the comprehension of the explanation, each drawing has exaggerated or omitted portions and the dimensional proportions thereof are not necessarily in agreement with actuality.

Figure 1B:
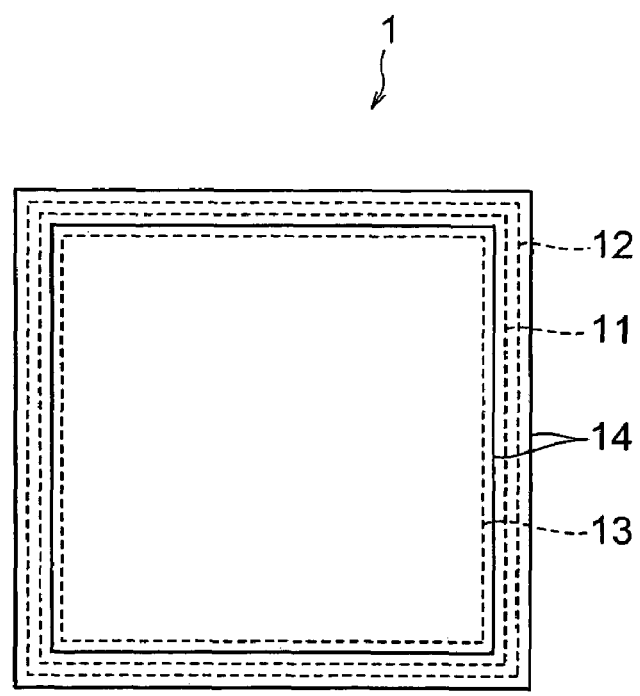
FIG. 1B is a plan view thereof.

FIG. 1A is a sectional view of a scintillator panel manufactured by a manufacturing method of a first embodiment, and FIG. 1B is a plan view thereof. As shown in FIG. 1A and FIG. 1B, scintillator panel 1 of this embodiment has a radiation-transmitting substrate 11, composed of glass or amorphous carbon or other material having carbon as the main component. On one surface of substrate 11 (the upper surface in FIG. 1A) is formed an organic film 12, which covers the one surface of substrate 11. Organic film 12 covers the entire one surface of substrate 11 and is formed continuously across the side surfaces of substrate 11. Substrate 11 is a thin substrate and although it has a rectangular shape in plan view, it may instead have a circular shape, etc., in plan view. Organic film 12 is composed of a xylene-based resin, such as polyparaxylylene (parylene (trade name), made by Three Bond Co., Ltd.), polyparachloroxylylene (parylene C (trade name), made by Three Bond Co., Ltd.).

On the surface of organic film 12 is formed a scintillator 13 that converts radiation, which enters upon being transmitted through substrate 11, to visible light or other light of a predetermined wavelength. For example, Tl-doped CsI is used in scintillator 13, and CsI has a structure wherein a plurality of needle-like crystals (columnar crystals) are bristled together. This scintillator 13 is formed by vapor deposition on the surface of a scintillator forming portion 12A, which is a portion of organic film 12 positioned at a position corresponding to substrate 11.

Furthermore, around substrate 11, organic film 12, and scintillator 13 is provided a protective film 14 that is formed so as to cover these components entirely. As with organic film 12, protective film 14 is composed of polyparaxylylene, polyparachloroxylylene or other xylene-based resin. By the provision of this protective film 14, deliquescence of scintillator 13 due to contact of scintillator 13 with external air is prevented.

Figure 2A:
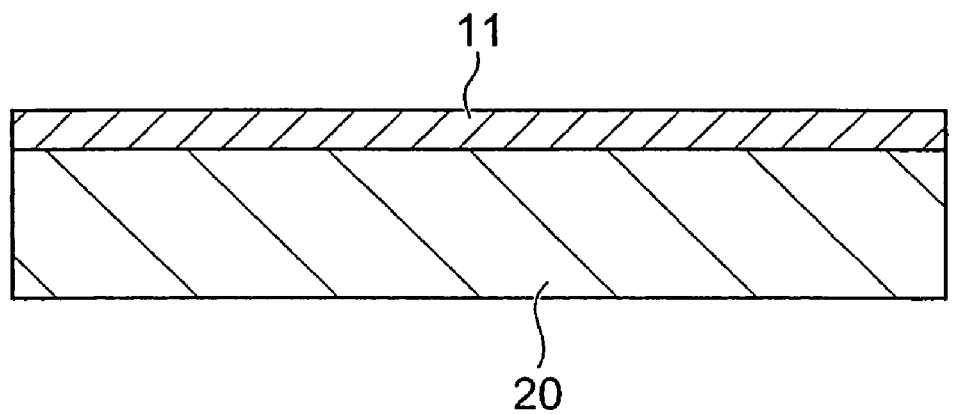
FIG. 2A to FIG. 6 (FIG. 2A, FIG. 2B, FIG. 3A, FIG. 3B, FIG. 4A, FIG. 4B, FIG. 5A, FIG. 5B, and FIG. 6) are diagrams for describing the scintillator panel manufacturing method according to this first embodiment.
Figure 2B:
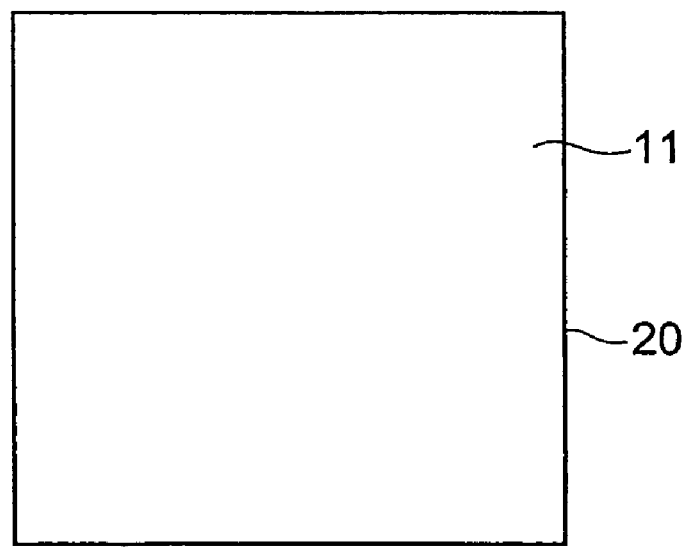

A process of manufacturing this scintillator panel 1 shall now be described with reference to FIG. 2A to FIG. 6. In manufacturing scintillator panel 1, an auxiliary substrate 20, shown in FIG. 2A to FIG. 5, is used. To describe the process of manufacturing scintillator panel 1, first as shown in FIG. 2A and FIG. 2B, substrate 11 is set on auxiliary substrate 20 for scintillator forming to overlap substrate 11 onto auxiliary substrate 20. As shown in FIG. 2B, auxiliary substrate 20 has the same rectangular shape as substrate 11 as its planar shape and the thickness thereof is thicker than that of substrate 11. Also, substrate 11 is simply set on auxiliary substrate 20 and is not adhered, etc.

Figure 3A:
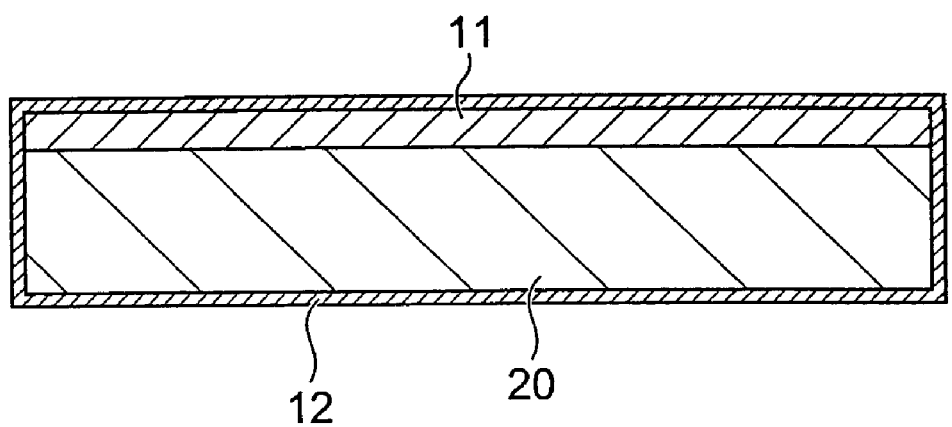
Figure 3B:
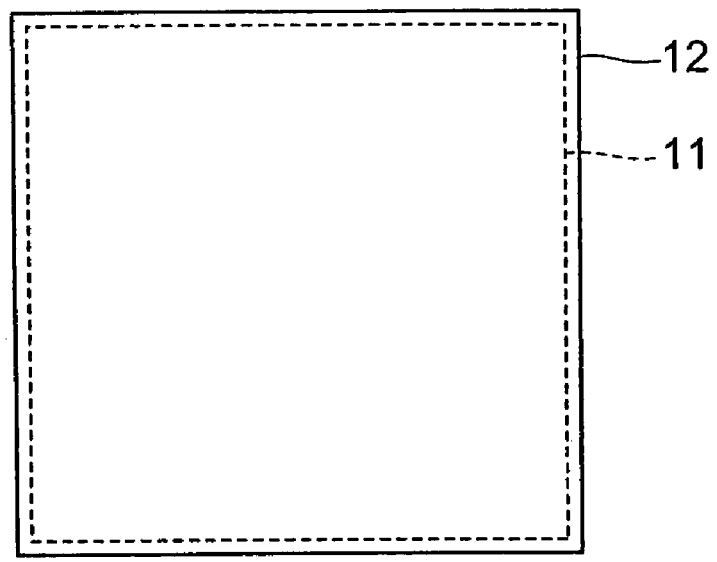

Substrate 11 and auxiliary substrate 20, which have thus been overlapped, are covered with organic film 12 as shown in FIG. 3A and FIG. 3B. Although substrate 11 and auxiliary substrate 20, which are covered with organic film 12, are not adhered together, these components are fastened together and put in a state of close contact by organic film 12. Also, since substrate 11 and auxiliary substrate 20 are the same in the shape in plan view, they are overlapped without becoming deviant with respect to each other. Upon covering substrate 11 and auxiliary substrate 20 with organic film 12, scintillator 13 is formed on the surface of scintillator forming portion 12A of organic film 12. Scintillator forming portion 12A of organic film 12 is at the upper side of substrate 11 and by forming the scintillator on scintillator forming portion 12A, a state wherein scintillator 13 is formed on substrate 11 across scintillator forming portion 12A is realized.

Figure 4A:
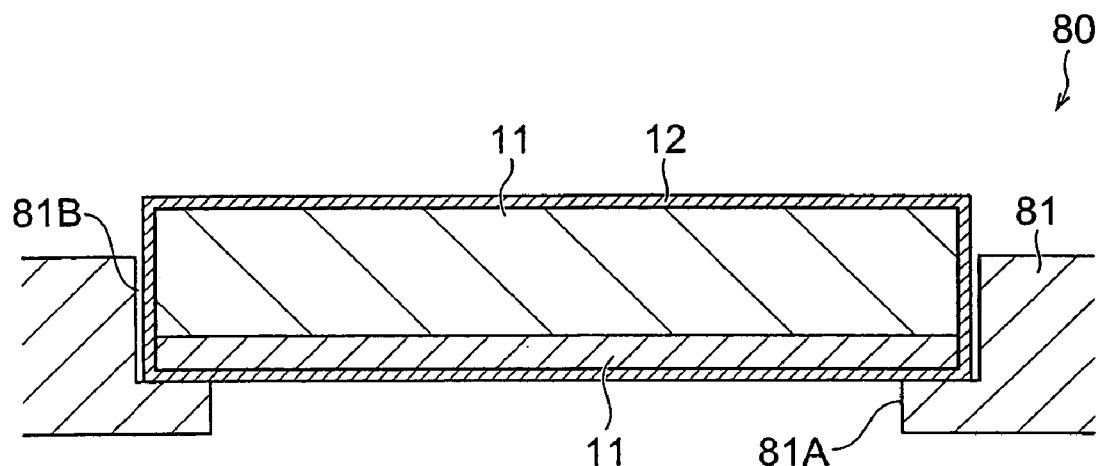
Figure 4B:
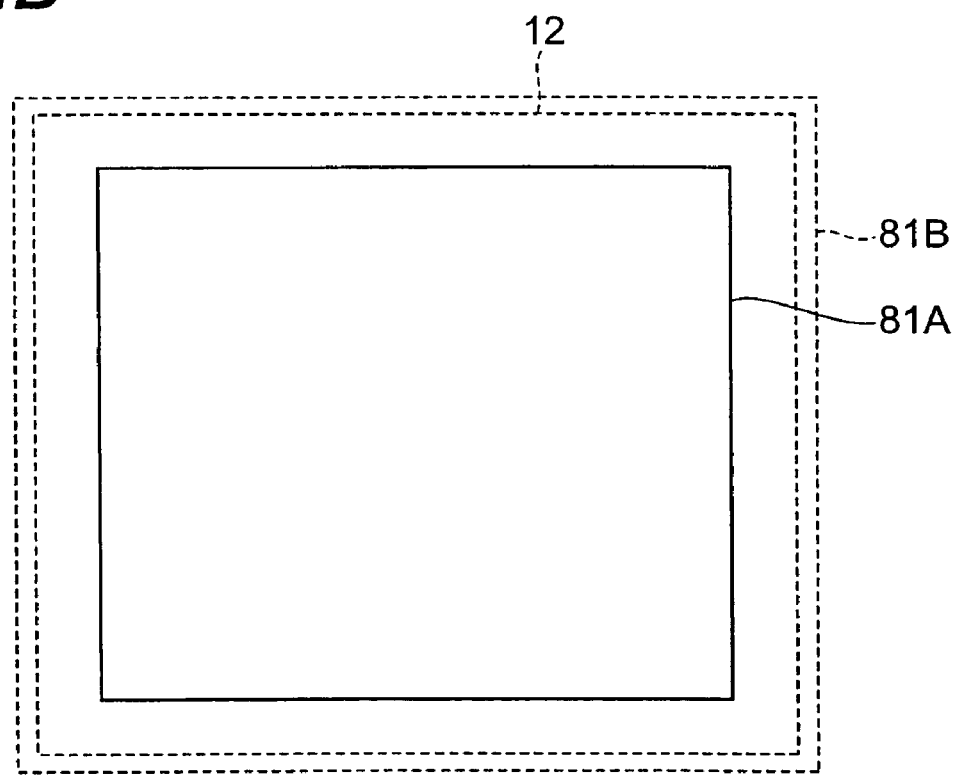

Here in forming scintillator 13, substrate 11 is suspended by holding it in a state where both ends of substrate 11 are held by a holding portion 81 of a vapor deposition device 80 as shown in FIG. 4A and FIG. 4B, and by vaporizing scintillator components from a vapor deposition chamber 82 at the lower side and vapor depositing the scintillator components onto the portion of substrate 11 that is exposed from opening 81A of holding portion 81, needle-like crystals are grown. Here, if the thin substrate 11 alone is just suspended on holding portion 81, substrate 11 may become warped by its own weight or the weight of the deposited scintillator. When substrate 11 thus becomes warped, the scintillator may not be formed uniformly on the substrate. In regard to this point, with the scintillator panel manufacturing method of this embodiment, in depositing the scintillator, substrate 11 and auxiliary substrate 20 are overlapped and these components are covered and thereby integrated by organic film 12 so that the state in which substrate 11 and auxiliary substrate 20 are overlapped is maintained. Since this auxiliary substrate 20 acts as a reinforcing plate, the warping of substrate 11 can be prevented effectively and the scintillator can be formed uniformly on one surface of substrate 11.

Figure 5A:
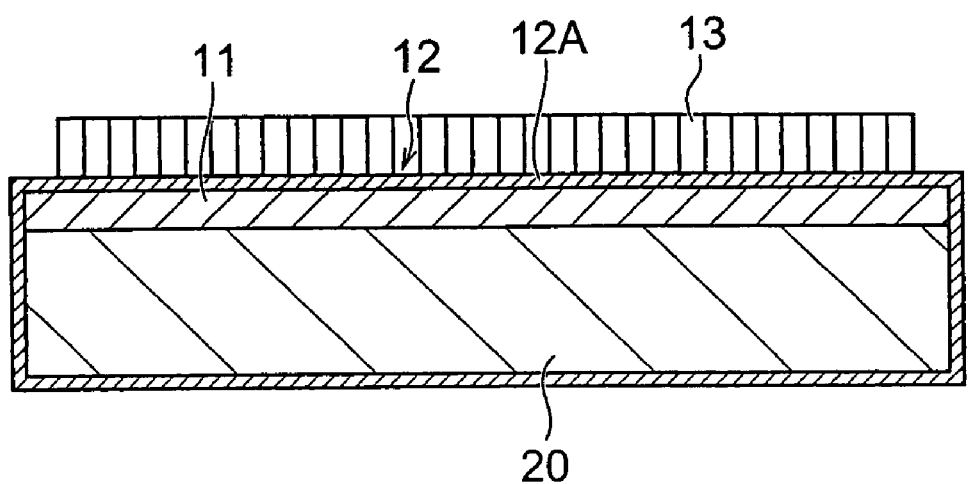
Figure 5B:
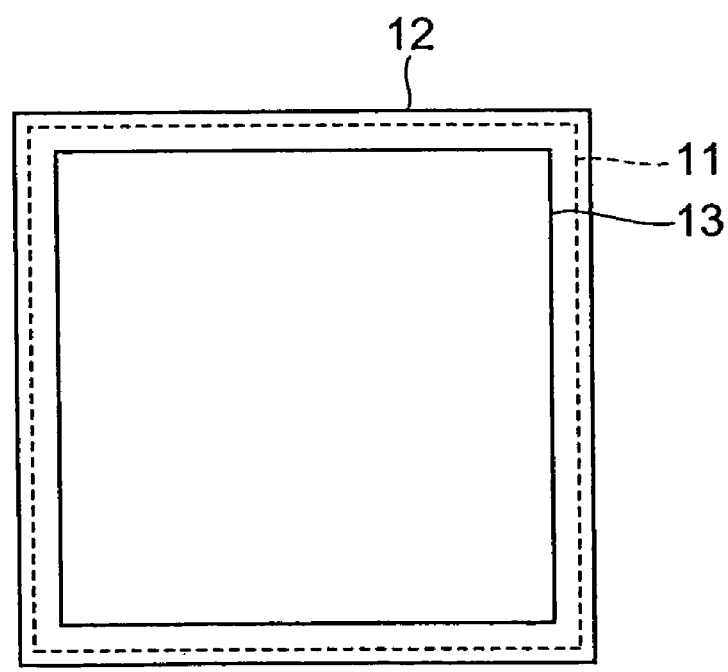
Figure 6:
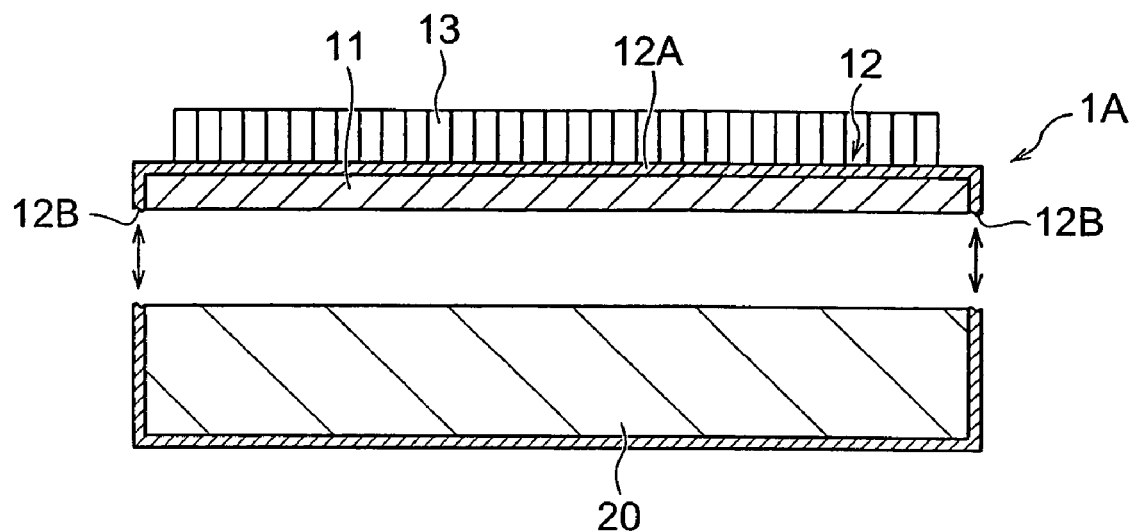

When scintillator 13 has thus been formed to a desired thickness on scintillator forming portion 12A of organic film 12 as shown in FIG. 5A and FIG. 5B, the entirety is taken out from vapor deposition device 80, and as shown in FIG. 6, organic film 12 is cut at the boundary portions between substrate 11 and auxiliary substrate 20. The cut portions are indicated by the symbol 12B. Here, since substrate 11 and auxiliary substrate 20 are not adhered, etc., scintillator forming portion 12A, on which scintillator 13 has been formed, and substrate 11 are separated from auxiliary substrate 20 by the cutting of organic film 12 at cut portions 12B. As a result, a scintillator panel 1a, having scintillator 13 formed via scintillator forming portion 12A on thin substrate 11, is provided.

Auxiliary substrate 20, which has been separated from substrate 11, etc., may be rejected as it is or may be washed, etc., and then reused as auxiliary substrate 20. By then entirely covering the entire scintillator panel 1a, comprising substrate 11, organic film 12, and scintillator 13, by protective film 14, scintillator panel 1, shown in FIG. 1A and FIG. 1B can be manufactured.

With scintillator panel 1 that has thus been manufactured, although a thin substrate 11 is used, the warping of substrate 11 in the process of forming scintillator 13 is prevented by auxiliary substrate 13. Scintillator 13 can thus be formed uniformly on substrate 11. Moreover, even if substrate 11 is of a large area, since auxiliary substrate 20 can favorably prevent the warping of substrate 11, scintillator 13 can be formed uniformly on substrate 11. Although in the present embodiment, substrate 11 and auxiliary substrate 20 are covered entirely by organic film 12, an embodiment, wherein these are not covered entirely but substrate 11 and auxiliary substrate 20 are covered by organic film 12 just to a degree to which these will not separate during the forming of scintillator 13, is also possible.

A second embodiment of the present invention shall now be described. With this embodiment, as with the above-described first embodiment, first, substrate 11 and auxiliary substrate 20 are overlapped (FIG. 2A and FIG. 2B), substrate 11 and auxiliary substrate 20 are covered by organic film 12 (FIG. 3A and FIG. 3B), and scintillator 13 is formed on the surface of scintillator forming portion 12A of organic film 12 (FIG. 4A, FIG. 4B, 5A, and FIG. 5B). The procedures up to this point are the same as those of the first embodiment described above.

Figure 7:
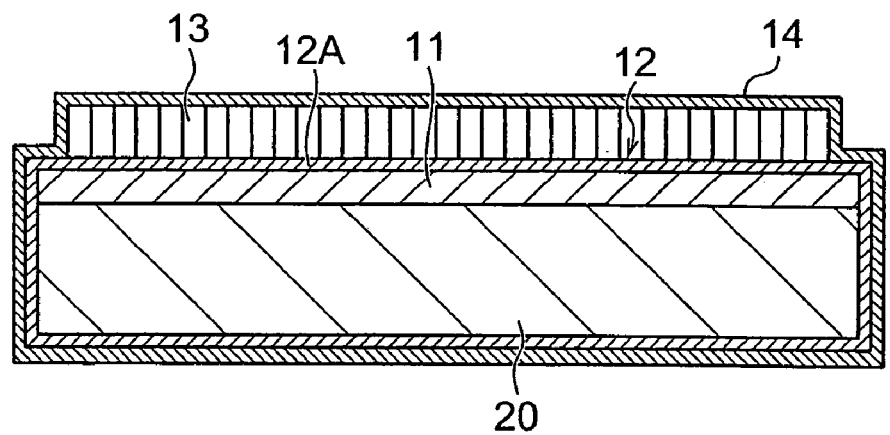
FIG. 7 and FIG. 8 are sectional views for describing a portion of the steps of a scintillator panel manufacturing method according to a second embodiment.
Figure 8:
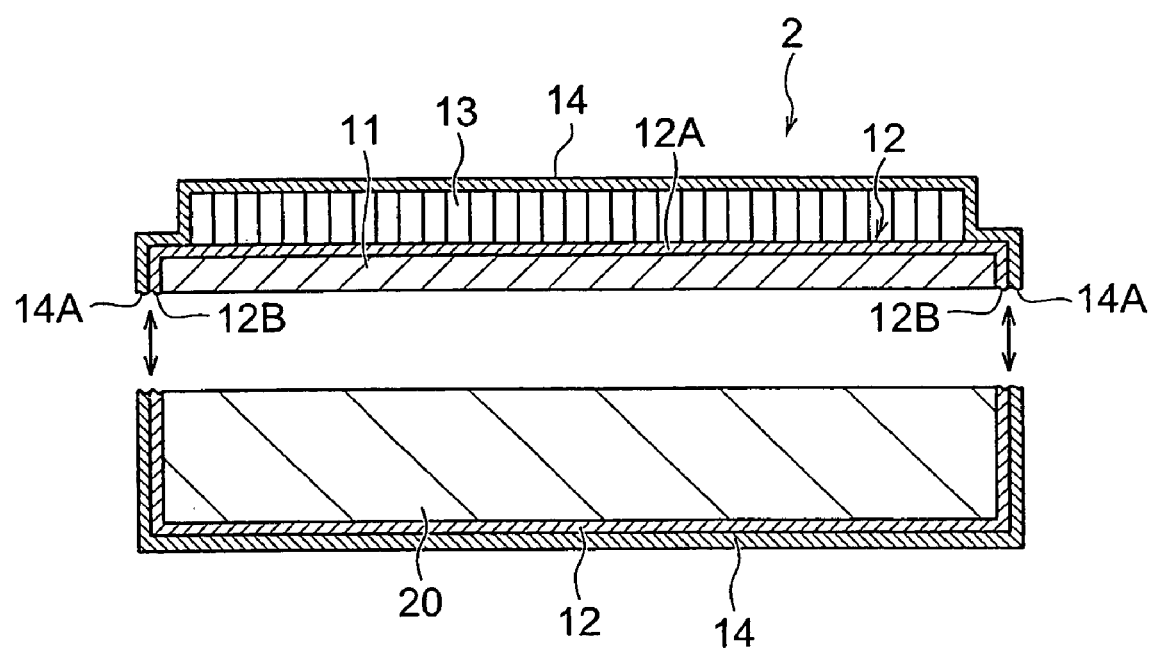

When scintillator 13 has thus been formed on the surface of scintillator forming portion 12A as shown in FIG. 7, organic film 12, which covers substrate 11 and auxiliary substrate 20, and scintillator 13, formed on scintillator forming portion 12A, are covered entirely by protective film 14. Then as shown in FIG. 8, organic film 12 and protective film 14 are cut at the boundary portions (cut portions 12B, 12B, 14A and 14A) of substrate 11 and auxiliary substrate 20. Since substrate 11 and auxiliary substrate 20 are not adhered, etc., scintillator forming portion 12A, on which scintillator 13 has been formed, and substrate 11 are separated from auxiliary substrate 20. As a result, a scintillator panel 2, having scintillator 13 formed via scintillator forming portion 12A on the thin substrate 11 and having scintillator 13 covered with protective film 14, is provided.

With scintillator panel 2, which is manufactured in the above-described manner, as with the above-described first embodiment, the warping of substrate 11 in the process of forming scintillator 13 is prevented by auxiliary substrate 20. Scintillator 13 can thus be formed uniformly on substrate 11. Moreover, even if substrate 11 is of a large area, since auxiliary substrate 20 can favorably prevent the warping of substrate 11, scintillator 13 can be formed uniformly on substrate 11.

Figure 9A:
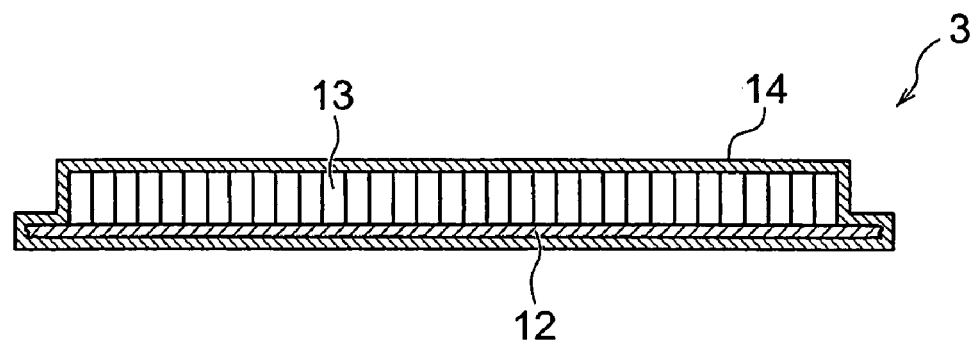
FIG. 9A is a sectional view of a scintillator panel manufactured by a scintillator panel manufacturing method of a third embodiment.
Figure 9B:
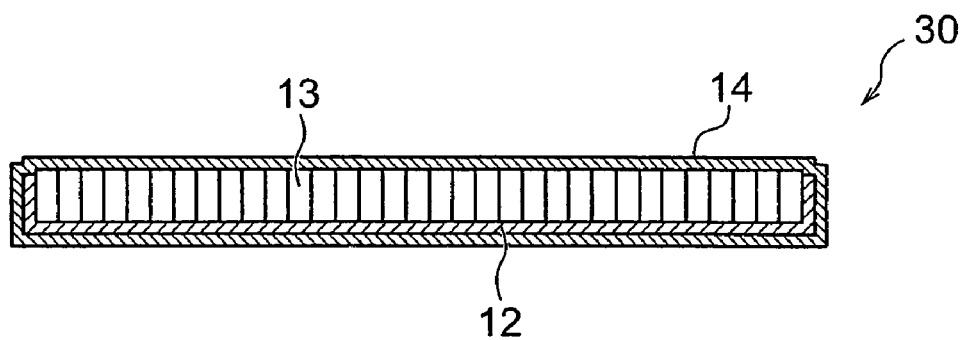
FIG. 9B is a sectional view of a modification example thereof.

Next, a third embodiment of the present invention shall now be described. FIG. 9A is a sectional view of a scintillator panel manufactured by a manufacturing method according to this embodiment, and FIG. 9B is a sectional view of a modification example thereof. As shown in FIG. 9A, with the scintillator panel 3 according to the present embodiment, scintillator 13 is formed on one surface of organic film 12, composed of polyparaxylylene, polyparachloroxylylene, or other xylene-based material, and organic film 12 and scintillator 13 are covered entirely by protective film 14. That is, with the present embodiment, organic film 12 serves in common as substrate 11.

Figure 10A:
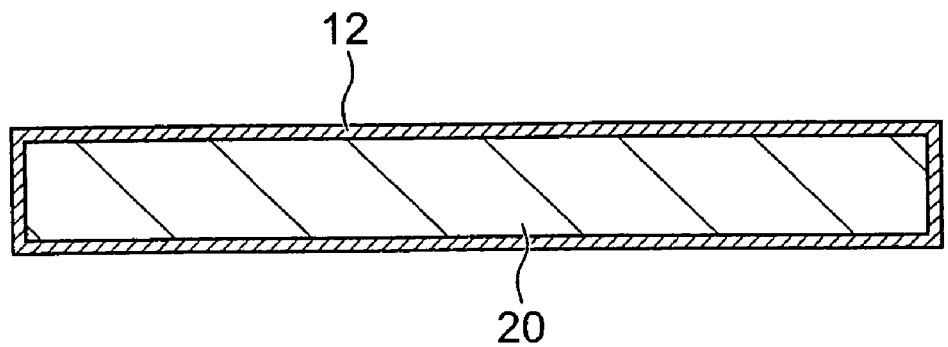
FIG. 10A to FIG. 12 (FIG. 10A, FIG. 10B, FIG. 11A, FIG. 11B, and FIG. 12) are diagrams for describing the scintillator panel manufacturing method according to the third embodiment.
Figure 10B:
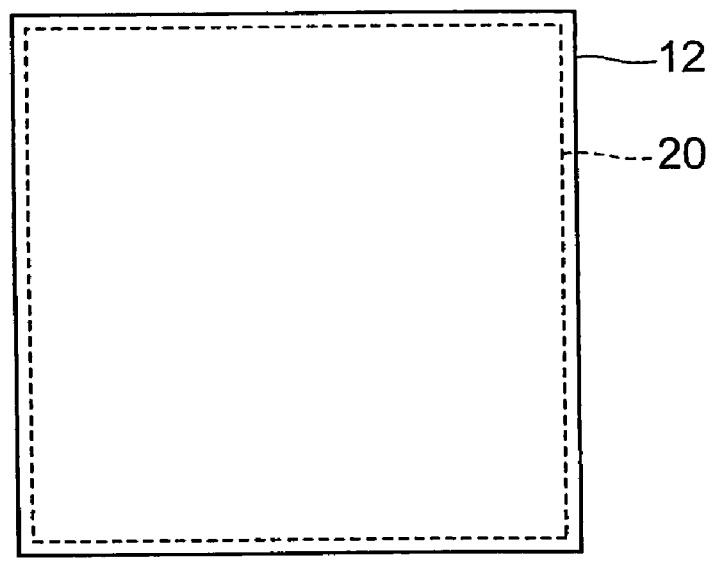
Figure 11A:
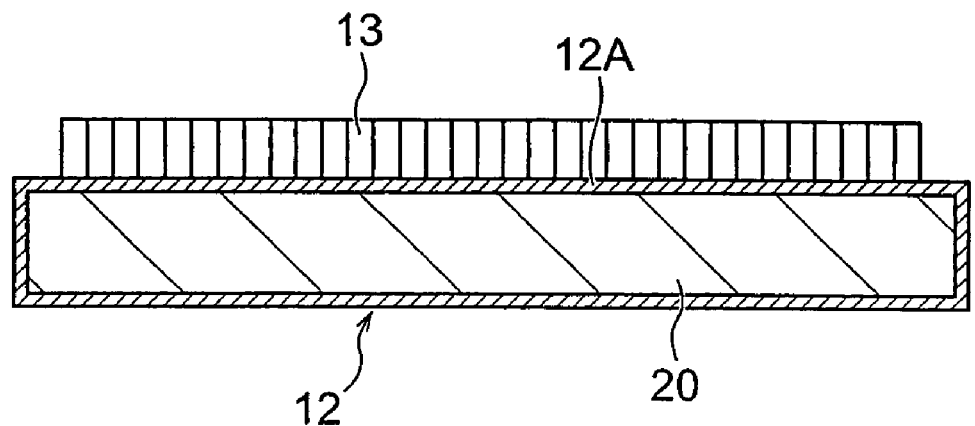
Figure 11B:
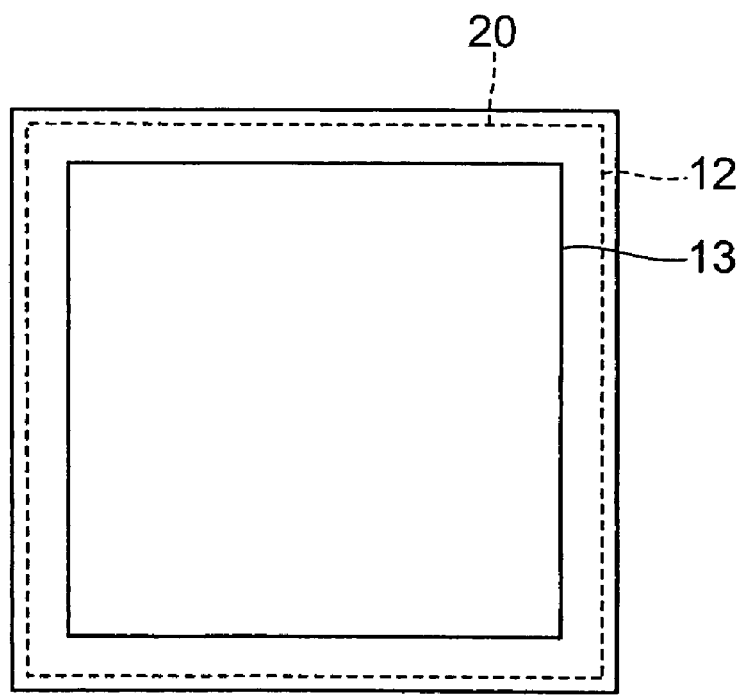

To describe the method of manufacturing this scintillator panel, first as shown in FIG. 10A and FIG. 10B, auxiliary substrate 20 for scintillator forming is prepared and the entirety of this auxiliary substrate is covered by organic film 12. This auxiliary substrate 20 has certain thickness and obviously it is preferably thicker than organic film 12 that is to be formed in particular. When auxiliary substrate 20 is covered by organic film 12, scintillator 13 is formed on scintillator forming portion 12A of the organic film 12 surface as shown in FIG. 11A and FIG. 11B. In forming scintillator 13, in the same manner as in the first embodiment shown in FIG. 4A and FIG. 4B, auxiliary substrate 20 is suspended inside vapor deposition 30 so that scintillator forming portion 12A of organic film 12 is positioned at the lower side and the scintillator components are vapor deposited. In this process, if auxiliary substrate 20 becomes warped due to the weight of auxiliary substrate 20 itself or the weight of scintillator 13, scintillator 13 may not be formed uniformly. However, with the present embodiment, since auxiliary substrate 20 of adequate thickness is used, the warping of scintillator forming portion 12A of organic film 12 can be prevented and scintillator 13 can be formed uniformly.

Figure 12:
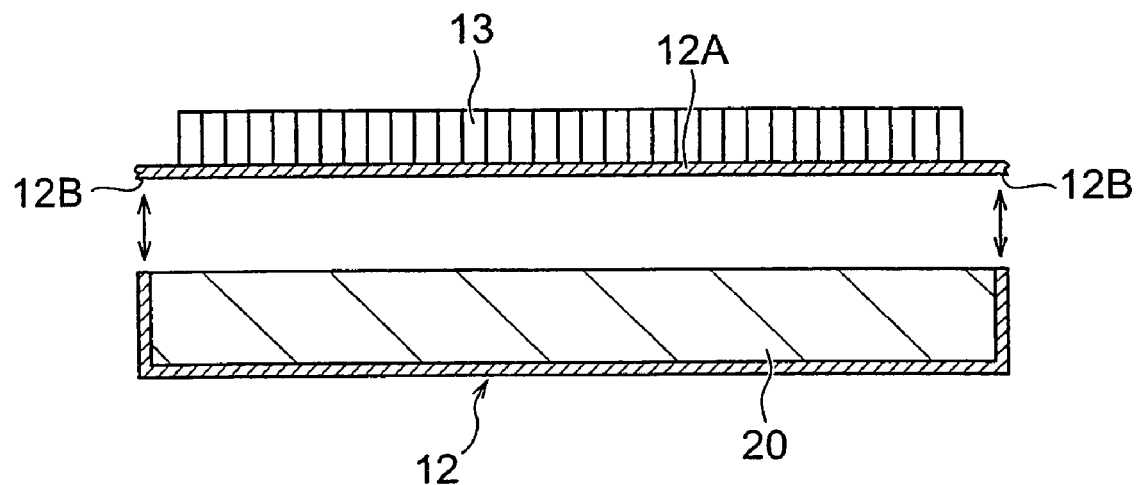

When scintillator 13 has thus been formed by vapor depositing the scintillator components, organic film 12 on auxiliary substrate 20 is cut at cut portions 12B at the outer sides of the forming surface of scintillator 13 as shown in FIG. 12. Here, since organic film 12 is formed just to cover auxiliary substrate 20 and is not adhered, etc., by cutting organic film 12, scintillator forming portion 12A and scintillator 13 on organic film 12 can be separated from auxiliary substrate 20 and the lower portions of organic film 12. By then entirely covering organic film 12 and scintillator 13 with protective film 14, scintillator panel 3, having organic film 12 as the substrate, is formed.

With scintillator panel 3, which is thus manufactured, organic film 12 is used as it is as the substrate. Thus by making organic film 12 thin, a scintillator panel having a thin substrate can be manufactured. With scintillator panel 3 having such a thin organic film substrate 12, organic film 12 is formed on thick auxiliary substrate 20 in the process of forming scintillator 13. Since thickness is added by this auxiliary substrate 20 to organic film 12, the warping and tearing of organic film 12 during the forming of scintillator 13 can be prevented. The scintillator can thus be formed uniformly on scintillator forming portion 12A of organic film 12. Moreover, even if scintillator forming portion 12A of organic film 12 is of a large area, since the warping and tearing of scintillator forming portion 12A can be prevented by auxiliary substrate 20, scintillator 13 can be formed uniformly on scintillator forming portion 12A. Although in the present embodiment, scintillator 13 is formed upon covering the entire auxiliary substrate 20 with organic film 12, an embodiment is also possible wherein auxiliary substrate 20 is covered not in its entirety but just at a portion including one surface thereof so that scintillator forming portion 12A will not fall off from auxiliary substrate 20 in the process of forming scintillator 13.

Also, as a modification example of the present embodiment, the mode shown in FIG. 9B is possible. With a scintillator panel 30, shown in FIG. 9B, end portions of organic film 12, which is to be the substrate, are bent towards the scintillator 13 side and folded along the side surfaces of scintillator 13. By thus folding the end portions of substrate 31, the area of the front side of scintillator panel 30 can be made substantially the same as the area of the front side of scintillator 13.

Figure 13A:
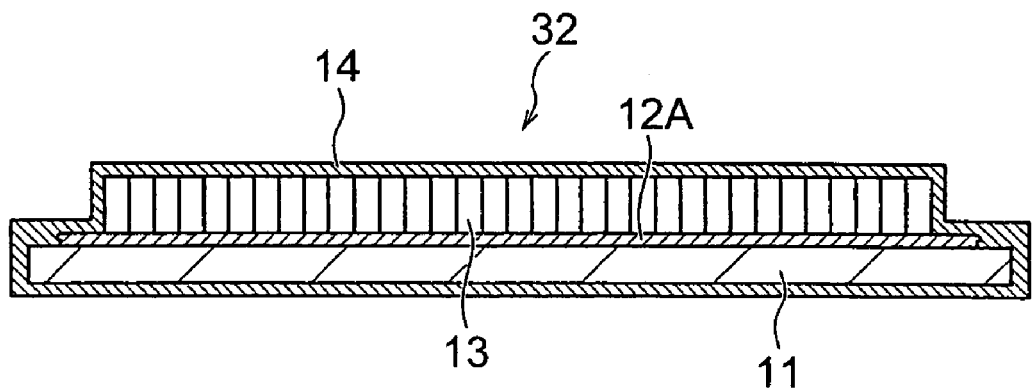
FIG. 13A is a sectional view of a scintillator panel manufactured by a scintillator panel manufacturing method according to a fourth embodiment.
Figure 13B:
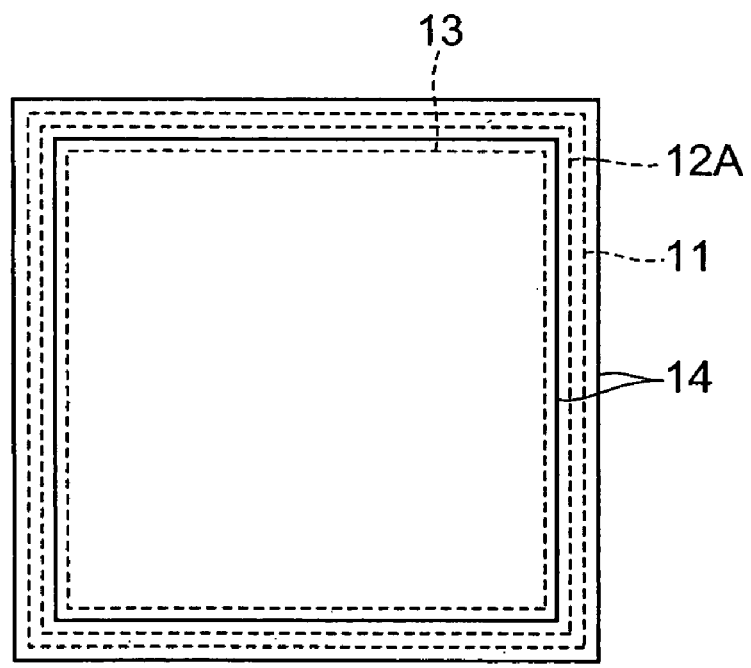
FIG. 13B is a front view thereof.

A fourth embodiment of the present invention shall now be described. FIG. 13A is a sectional view of a scintillator panel 32 of this embodiment, and FIG. 13B is a front view thereof. As shown in FIG. 13A and FIG. 13B, with scintillator panel 32 of this embodiment, scintillator forming portion 12A is set on substrate 11. This substrate 11, scintillator forming portion 12A, and scintillator 13 are covered entirely by protective film 14. Whereas in the third embodiment described above, scintillator forming portion 12A of organic film 12 is used as it is as the substrate, in the present embodiment, a substrate is provided separately.

To describe the method of manufacturing scintillator panel 32 of the present embodiment, first, auxiliary substrate 20 is prepared and the entire auxiliary substrate 20 is covered with organic film 12 in the same manner as in the third embodiment described above, that is, as shown in FIG. 10A and FIG. 10B. The scintillator components are then vapor deposited onto scintillator forming portion 12A of organic film 12 to form scintillator 13 as shown in FIG. 11A and FIG. 11B. When scintillator 13 is formed, organic film 12 is cut at cut portions 12B as shown in FIG. 12 and organic film is thereby cut vertically to separate scintillator forming portion 12A of organic film 12 from auxiliary substrate 20. The manufacturing steps up to this point are the same as those of the third embodiment described above.

When scintillator forming portion 12A and scintillator 13 have been separated from auxiliary substrate 20, scintillator forming portion 12A is set on substrate 11 with the surface that had been in contact with auxiliary substrate 20 facing substrate 11. Substrate 11, scintillator forming portion 12A, and scintillator 13 are then covered entirely with protective film 14, thereby manufacturing scintillator panel 32.

With scintillator panel 32 thus manufactured, by using a thin substrate as substrate 11, the thickness of scintillator panel 32 itself can be made thin. Also, even if a thin substrate is used as substrate 11, since auxiliary substrate 20, which is thick, is used to prevent the warping and tearing of scintillator forming portion 12A in the process of forming scintillator 13, scintillator 13 can be formed uniformly on scintillator forming portion 12A.

Figure 14A:
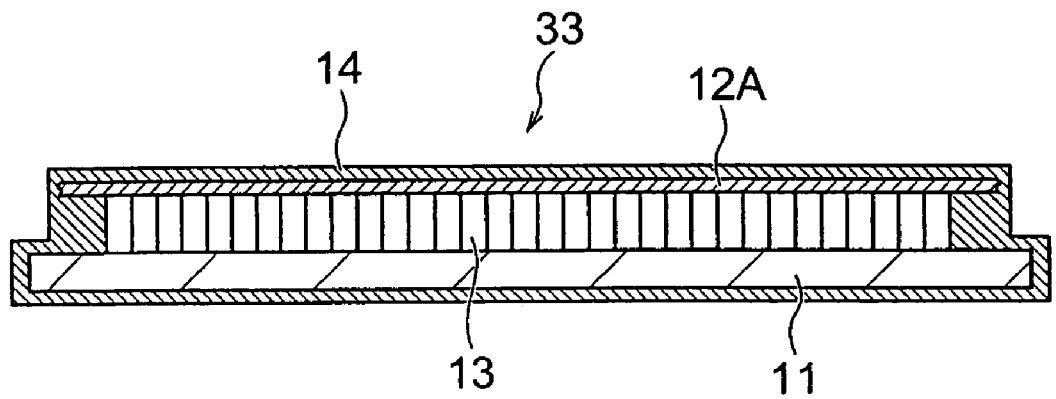
FIG. 14A is a sectional view of a scintillator panel manufactured by a scintillator panel manufacturing method according to a fifth embodiment.
Figure 14B:
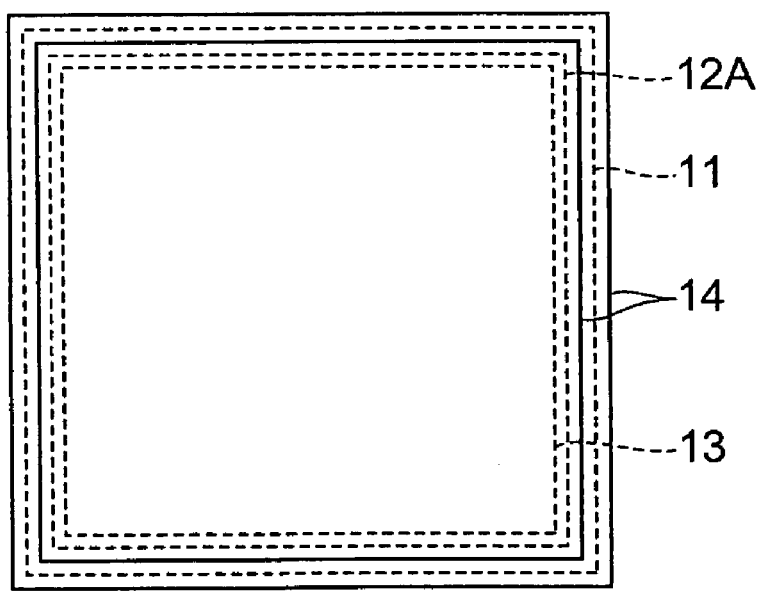
FIG. 14B is a front view thereof.

A fifth embodiment of this invention shall now be described. FIG. 14A is a sectional view of a scintillator panel manufactured by a manufacturing method according to the present embodiment, and FIG. 14B is a front view thereof. As shown in FIG. 14A and FIG. 14B, although scintillator 13 is set on substrate 11 in this scintillator panel 33, this scintillator 13 is formed on scintillator forming portion 12A, and an arrangement, wherein scintillator 13 is sandwiched by scintillator forming portion 12A and substrate 11, is employed. This substrate 11, scintillator 13, and scintillator forming portion 12A are covered by protective film 14. The present embodiment is of a mode wherein scintillator forming portion 12A is not used as it is as the substrate and another substrate is provided separately.

To describe the method of manufacturing scintillator panel 33 of the present embodiment, first, auxiliary substrate 20 is covered entirely with organic film 12 in the same manner as in the manufacturing step shown in FIG. 10A and FIG. 10B. Then as shown in FIG. 11A and FIG. 11B, scintillator 13 is formed on scintillator forming portion 12A. When scintillator 13 is formed, scintillator forming portion 12A of organic film 12 is separated from auxiliary substrate 20 as shown in FIG. 12. Then as shown in FIG. 14A, the exposed surface of scintillator 13 is made to face substrate 11 side and scintillator 13 is set so as to contact the surface of substrate 11. Substrate 11, scintillator 13, and scintillator forming portion 12A are then covered with protective film 14.

Scintillator panel 33 can thus be manufactured. As with the embodiments described above, with scintillator panel 33 that is thus manufactured, substrate 11, which is thin, can be used, and even when a thin substrate is used, scintillator 13 can be formed uniformly.

Figure 15A:
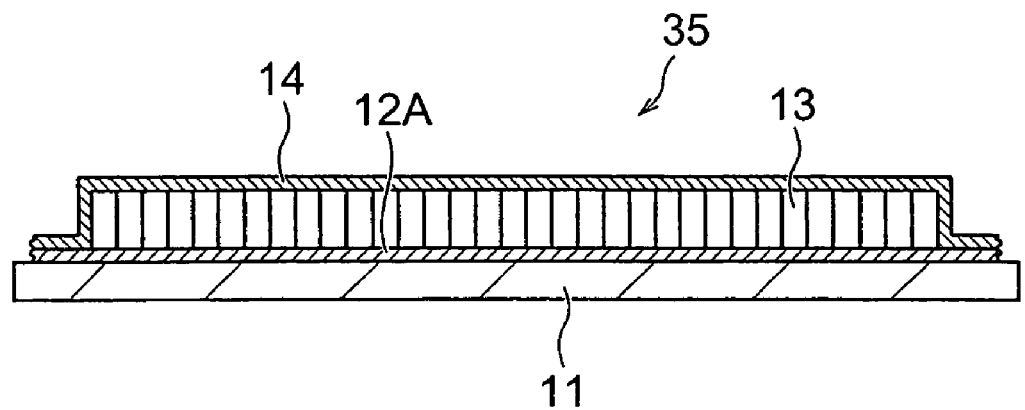
FIG. 15A is a sectional view of a scintillator panel manufactured by a scintillator panel manufacturing method according to a sixth embodiment.
Figure 15B:
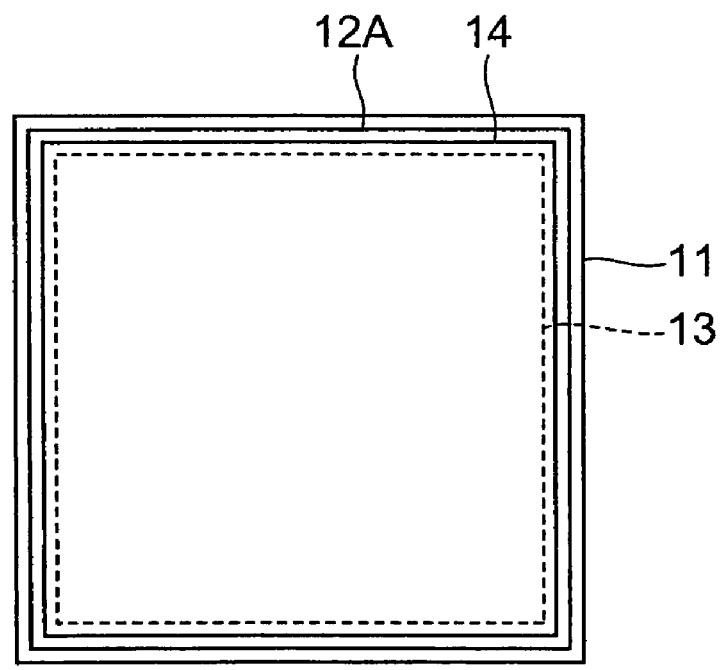
FIG. 15B is a front view thereof.

A sixth embodiment of this invention shall now be described. FIG. 15A is a sectional view of a scintillator panel manufactured by a manufacturing method according to the present embodiment, and FIG. 15B is a front view thereof. As shown in FIG. 15A and FIG. 15B, scintillator panel 35 has substrate 11. Scintillator forming portion 12A is set on substrate 11, and scintillator 13 is formed on scintillator forming portion 12A. Also, the surfaces of scintillator 13 and scintillator forming portion 12A are covered by protective film 14.

Figure 16A:
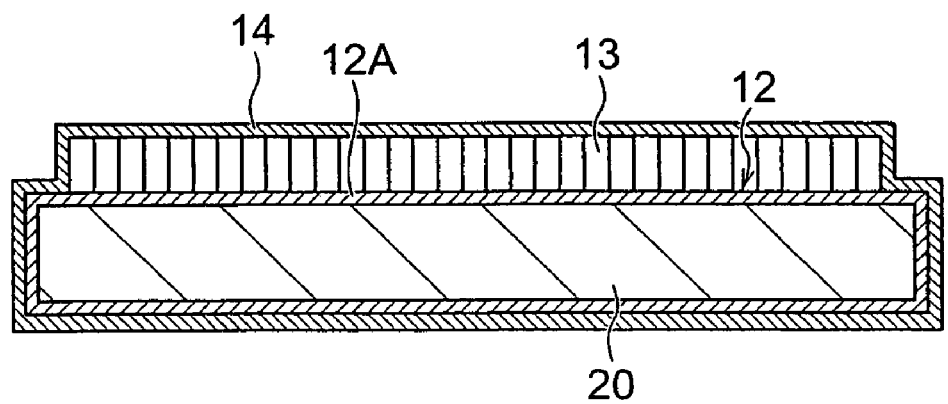
FIG. 16A, FIG. 16B, and FIG. 17 are diagrams for describing the scintillator panel manufacturing method according to the sixth embodiment.
Figure 16B:
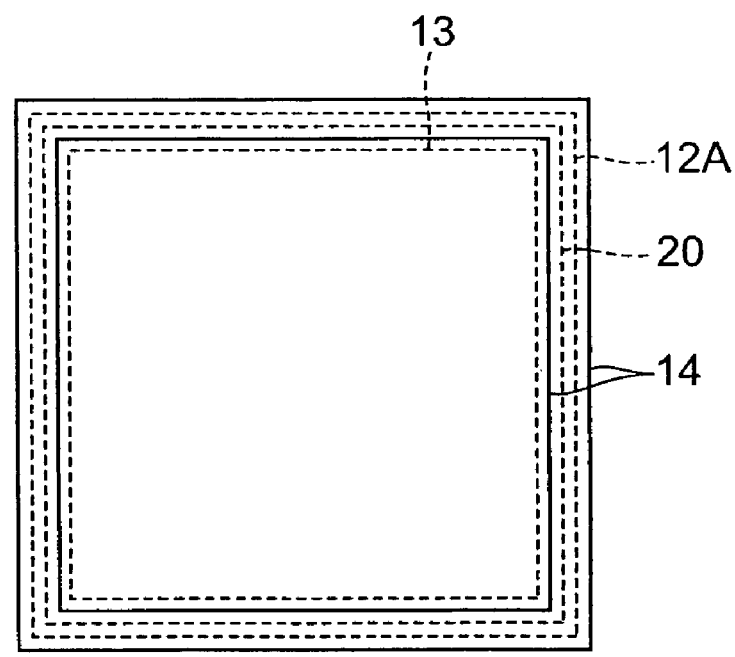
Figure 17:
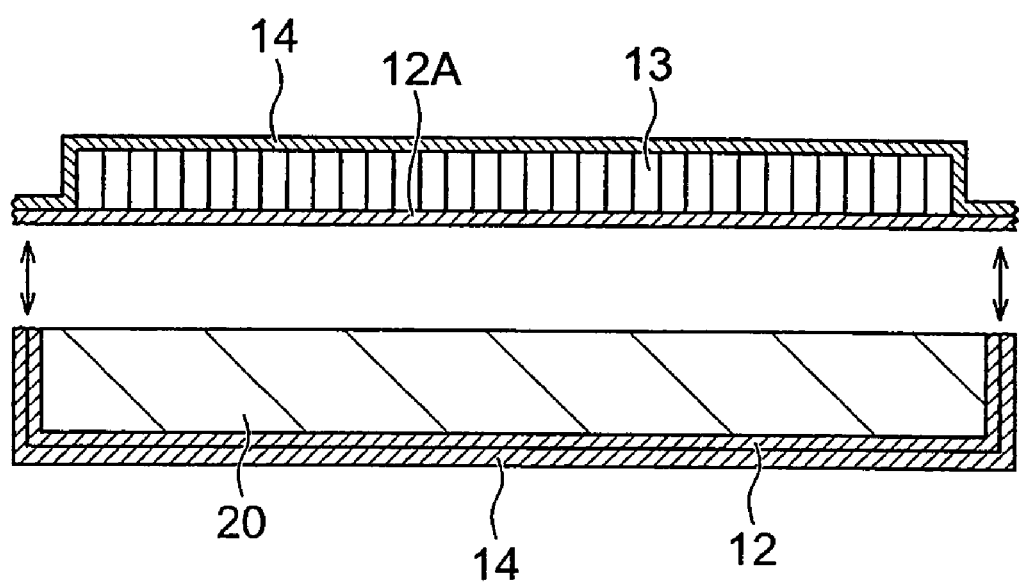

To describe the method of manufacturing scintillator panel 35 of the present embodiment, first, as shown in FIG. 10A and FIG. 10B, auxiliary substrate 20 is prepared and auxiliary substrate 20 is covered with organic film 12. The scintillator components are then vapor deposited onto scintillator forming portion 12A of organic film 12 to form scintillator 13 as shown in FIG. 11A and FIG. 11B. Up to this point, the present embodiment is the same as the third to fifth embodiments described above. In the present embodiment, after forming scintillator 13 as shown in FIG. 16A and FIG. 16B, organic film 12, which covers auxiliary substrate 20, and scintillator 13 are covered with protective film 14. Then as shown in FIG. 17, organic film 12 and protective film 14 are cut to separate scintillator forming portion 12A of organic film 12 and scintillator 13 from auxiliary substrate 20. Then as shown in FIG. 15A, scintillator forming portion 12A is mounted on substrate 11. Needless to say, the arrangement shown in FIG. 17, wherein scintillator forming portion 12A and scintillator 13, which have been separated from auxiliary substrate 20, are covered with protective film 14, can be used as it is as a scintillator panel. In this case, scintillator forming portion 12A functions as the substrate.

With scintillator panel 35 thus manufactured, as with the respective embodiments described above, by using a thin substrate as substrate 11, the thickness of scintillator panel 35 itself can be made thin. Also, even if a thin substrate is used as substrate 11, since auxiliary substrate 20, which is thick, is used to prevent the warping and tearing of scintillator forming portion 12A in the process of forming scintillator 13, scintillator 13 can be formed uniformly on scintillator forming portion 12A.

A seventh embodiment of this invention shall now be described. With this embodiment, a method of manufacturing a radiation image sensor that uses a scintillator panel shall be described.

Figure 18A:
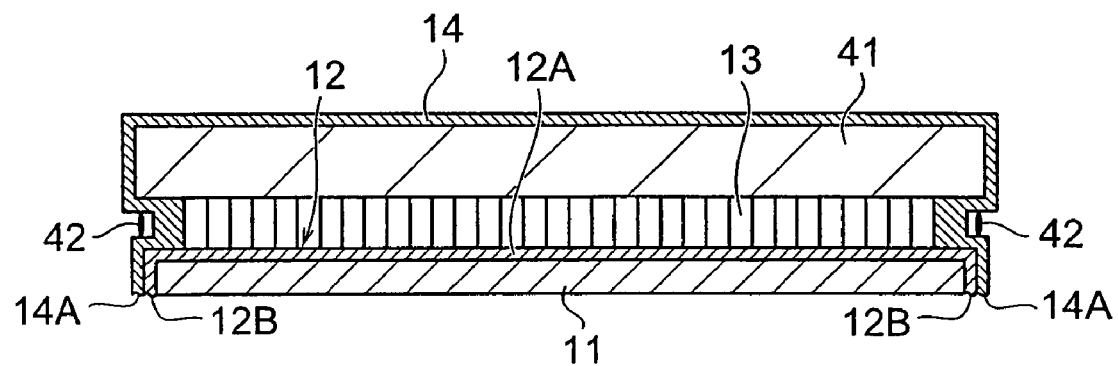
FIG. 18A is a sectional view of a radiation detector manufactured by a radiation image sensor manufacturing method according to a seventh embodiment.
Figure 18B:
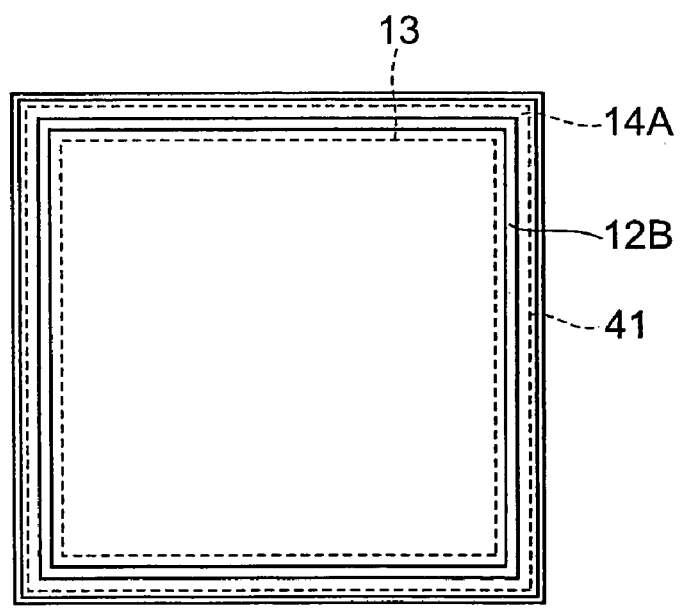
FIG. 18B is a front view thereof.

FIG. 18A is a sectional view of a radiation detector manufactured by the manufacturing method according to the present embodiment, and FIG. 18B is a front view thereof as seen from the scintillator panel side. As shown in FIG. 18A, radiation image sensor 40 of the present embodiment has substrate 11. Substrate 11 is covered from its upper surface to its side surfaces with organic film 12. Scintillator 13 is formed on scintillator forming portion 12A, which corresponds to being an upper portion of organic film 12. On scintillator 13 is mounted an image pickup element 41. Substrate 11, organic film 12, scintillator 13, and image pickup element 41 are covered by protective film 14. Furthermore, on portions of protective film 14 that cover the side walls of scintillator 13 is disposed a sealing material 42, which is composed of a resin with moisture-proof properties.

The method of manufacturing the radiation image sensor having the above arrangement according to the present invention shall now be described. First, by the same procedures as those of the first embodiment, substrate 11 and auxiliary substrate 20 are overlapped (see FIG. 2A and FIG. 2B), substrate 11 and auxiliary substrate 20 are covered with organic film 12 (see FIG. 3A and FIG. 3B), and thereafter, scintillator 13 is formed on the surface of scintillator forming portion 12A (see FIG. 4A, FIG. 4B, FIG. 5A, and FIG. 5B).

In forming scintillator 13, since substrate 11 is overlapped with auxiliary substrate 20, the warping of substrate 11 due to the weight of substrate 11 itself and the weight of scintillator 13 is prevented as in the respective embodiments described above, and scintillator 13 can thus be formed uniformly.

Figure 19A:
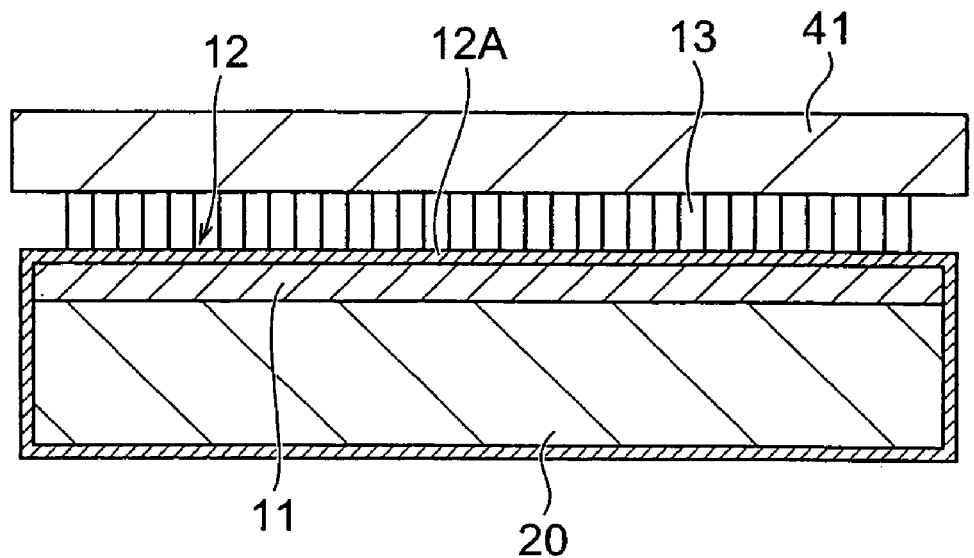
FIG. 19A, FIG. 19B, FIG. 20, and FIG. 21 are diagrams for describing the radiation detector manufacturing method according to the seventh embodiment.
Figure 19B:
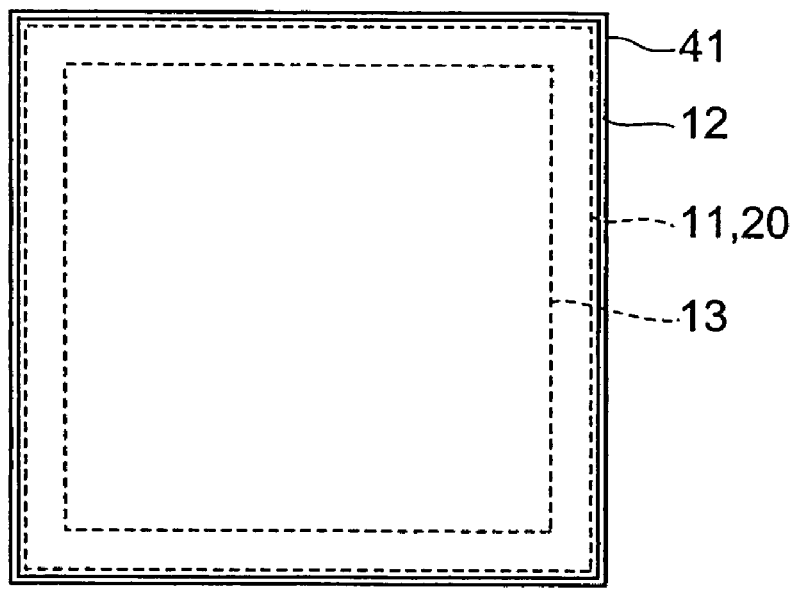
Figure 20:
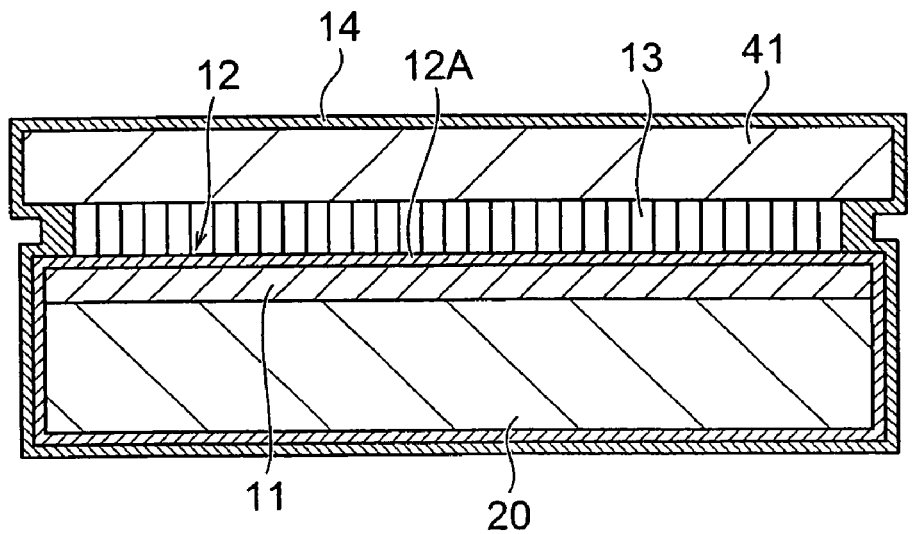
Figure 21:
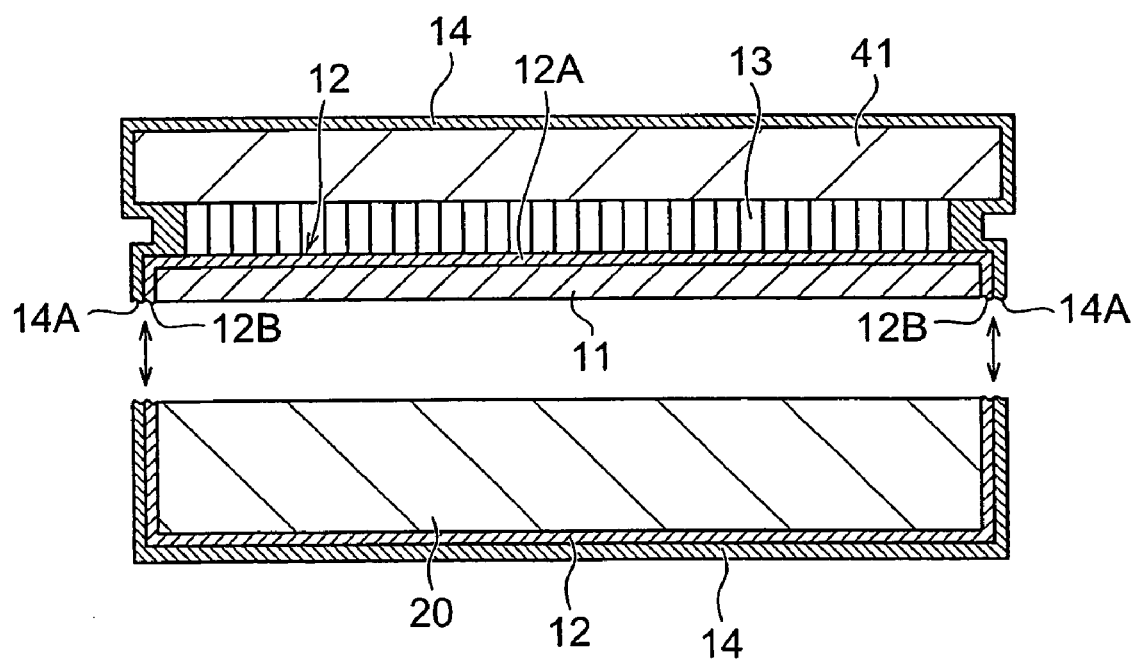

When scintillator 13 is formed, scintillator 13 is set on image pickup element 41 with the exposed surface of scintillator 13 and a light receiving surface of image pickup element 41 being made to face each other as shown in FIG. 19A and FIG. 19B. By means of this image pickup element 41, the light generated by scintillator emission of scintillator 13 can be detected. Upon mounting image pickup element 41, organic film 12, covering substrate 11 and auxiliary substrate 20, scintillator 13, and image pickup element 41 are covered with protective film 14 as shown in FIG. 20. Then as shown in FIG. 21, organic film 12 and protective film 14 are cut at boundary portions (cut portions 12B and 14A) between substrate 11 and auxiliary substrate 20 to separate substrate 11 from auxiliary substrate 20 and thereby manufacture radiation image sensor 40.

With radiation image sensor 40 thus manufactured, although thin substrate 11 is used, the warping of substrate 11 in the process of forming scintillator 13 is prevented by auxiliary substrate 20. Scintillator 13 can thus be formed uniformly. Since scintillator 13 is formed uniformly, the scintillator light that is obtained by the actions of scintillator 13 will be uniform and favorable images can be obtained by image pickup element 41.

The radiation image sensor is not limited to the above-described mode and may be manufactured by mounting the scintillator panel, manufactured by any of the first embodiment to sixth embodiment described above, to the light receiving surface of a solid-state image pickup element. Specifically, a radiation detector can be arranged by mounting, via organic film 14, the surface of scintillator 13 of scintillator panel 1 of the first embodiment shown in FIG. 1 to the light receiving surface of the solid-state image pickup element. Also, a radiation detector can be arranged by mounting, via organic film 14, the surface of scintillator 13 of scintillator panel 2 shown in FIG. 8, the surface of scintillator panel 3 or 30 of the third embodiment shown in FIG. 9A or 9B, the surface of scintillator panel 32 of the fourth embodiment shown in FIG. 13A and FIG. 13B, or the surface of scintillator panel 35 of the sixth embodiment shown in FIG. 16A and FIG. 16B to the light receiving surface of the solid-state image pickup element. By thus mounting the scintillator, not across the substrate but across organic film 14, to the solid-state image pickup element, the layer interposed between the scintillator and the light receiving surface of the solid-state image pickup element can be made thin. A radiation detector can also be arranged by mounting, via scintillator forming portion 12A and organic film 14, the surface of scintillator 13 of scintillator panel 33 of the fifth embodiment shown in FIG. 14A and FIG. 14B to the light receiving surface of the solid-state image pickup element.

Figure 22A:
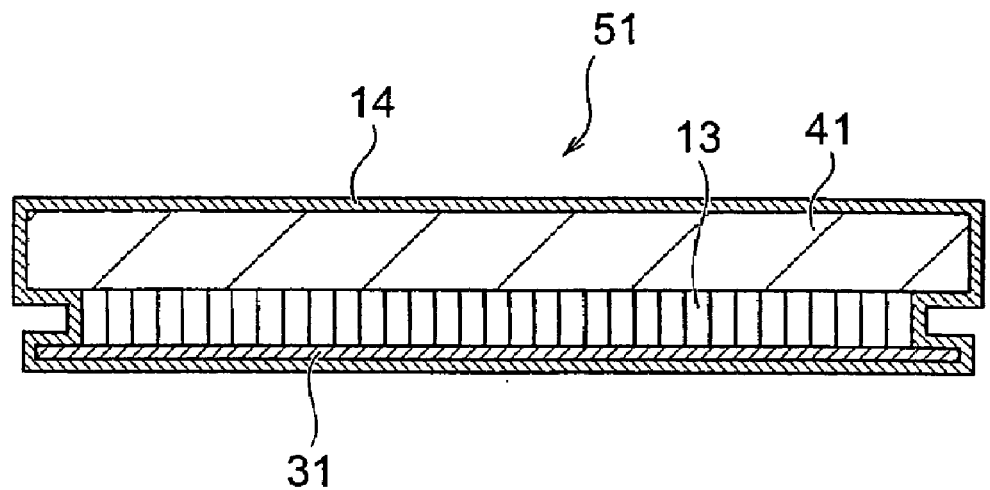
FIG. 22A is a sectional view of a radiation image sensor according to an eighth embodiment.
Figure 22B:
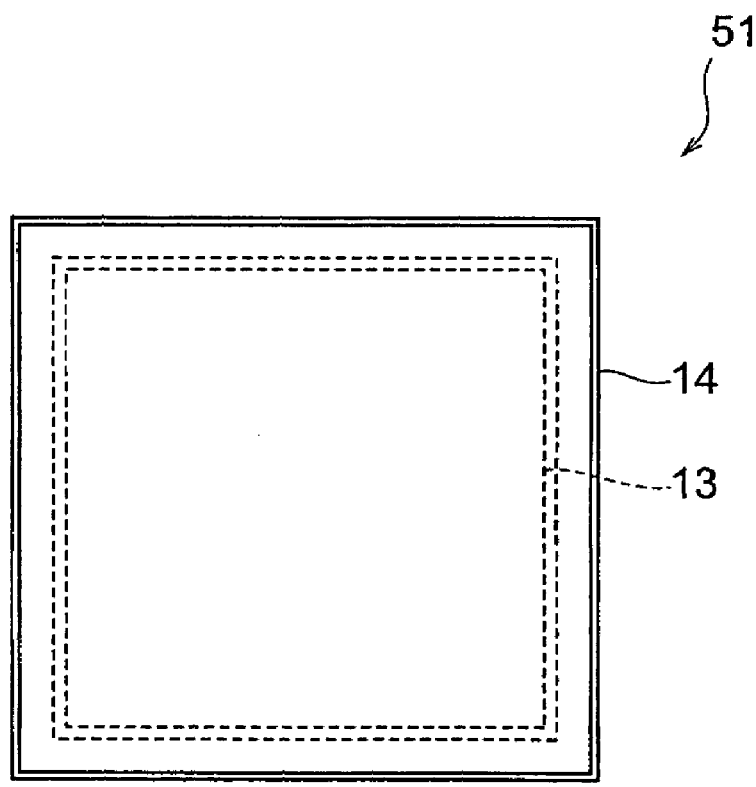
FIG. 22B is a front view thereof.

An eighth embodiment of the present invention shall now be described. FIG. 22A and FIG. 22B are sectional views of a radiation image sensor of the eighth embodiment of the present invention. Although with the above-described embodiment, a solid-state image pickup element is mounted on a completed scintillator panel, with the present embodiment, a radiation detector is manufactured by mounting a solid-state image pickup element to the scintillator of a scintillator panel prior to completion. As shown in FIG. 22A, with radiation image sensor 51 of the present embodiment, the surface of scintillator 13, used in manufacturing scintillator panel 3 (FIG. 9A) of the third embodiment, is mounted on solid-state image pickup element 41. Although in the third embodiment, scintillator 13, shown in FIG. 12, and scintillator forming portion 31 are covered with organic film 14 to form scintillator panel 3, here, after mounting the exposed surface of scintillator 13, shown in FIG. 12, to the light receiving surface of solid-state image pickup element 41, scintillator 13, scintillator forming portion 31, and solid-state image pickup element 41 are covered with organic film 14. Radiation image sensor 51, shown in FIG. 22A and FIG. 22B can thus be manufactured. By this method, a thin radiation detector 51 can be manufactured.

When scintillator 13 is to be mounted directly to the light receiving surface of the solid-state image pickup element as in the present embodiment wherein scintillator 13, shown in FIG. 12, or scintillator 13, shown in FIG. 6, is to be mounted on the light receiving surface of the solid-state image pickup element, the scintillator and the solid-state image pickup element are preferably coated with a protective film. To perform coating with a protective film, the method disclosed in International Patent Application No. WO98/36920 pamphlet may be used. With this method, the protective film comprises: a first organic film, comprising parylene or other organic film; an inorganic film, comprising an aluminum film; and a second organic film, which again comprises parylene or other organic film. The first organic film is formed so as to cover the entire scintillator 13. The first organic film covers the entire scintillator 13 and attaches to the surface of scintillator forming portion 12A, and the first organic film is in close contact with scintillator 13. The aluminum film is then vapor deposited onto the first organic film to form the inorganic film, and then the second organic film is formed on top. Corrosion of the inorganic film can thereby be prevented by the second organic film, and scintillator 13 can be protected from deliquescence and other physical and chemical degradation, damage, etc.

Or, the method disclosed in International Patent application No. WO98/36291 pamphlet may be used. With this method, the protective film comprises: a first organic film, comprising parylene or other organic film; an inorganic film, comprising an aluminum film; and a second organic film, comprising parylene or other organic film. Prior to forming this protective film, a narrow, frame-like resin frame is formed at positions surrounding the periphery of scintillator 13 on scintillator forming portion 12A. In order to realize improved close contact with the protective film, the resin frame is preferably subject to a surface roughening process. This surface roughening process is performed by scratching or forming small depressions in the surface, etc. The entire surface of scintillator forming portion 12A is then covered along with the scintillator and the resin frame with the first organic film so as to cover scintillator 13. In this process, the first organic film is put in close contact with scintillator 13. The aluminum film is then formed on the surface of the first organic film to form the inorganic film and then the second organic film is formed on the surface of the inorganic film. By then cutting the protective film along the priorly formed resin frame by a cutter, a protective film that covers scintillator 13 is formed.

A protective film that covers the scintillator can be formed favorably by these methods.

Figure 23A:
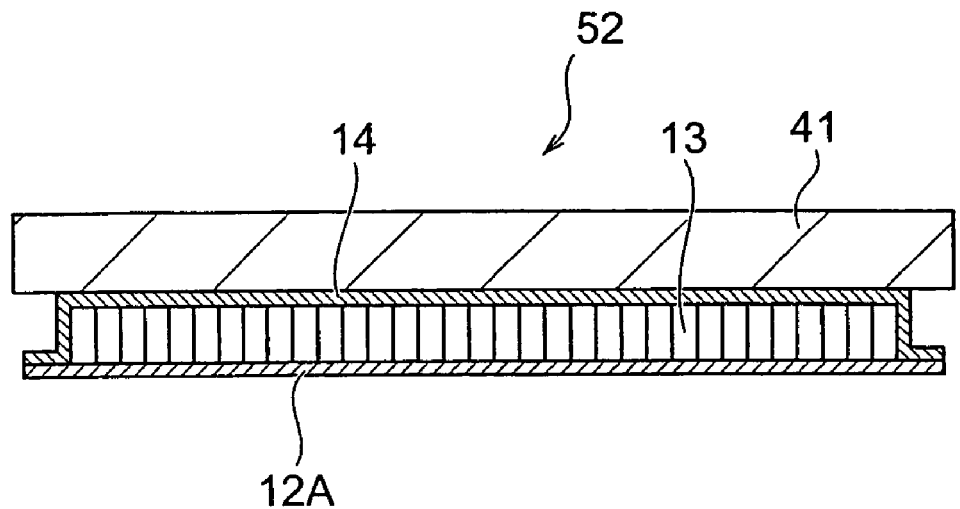
FIG. 23A is a sectional view of a radiation image sensor according to a ninth embodiment.
Figure 23B:
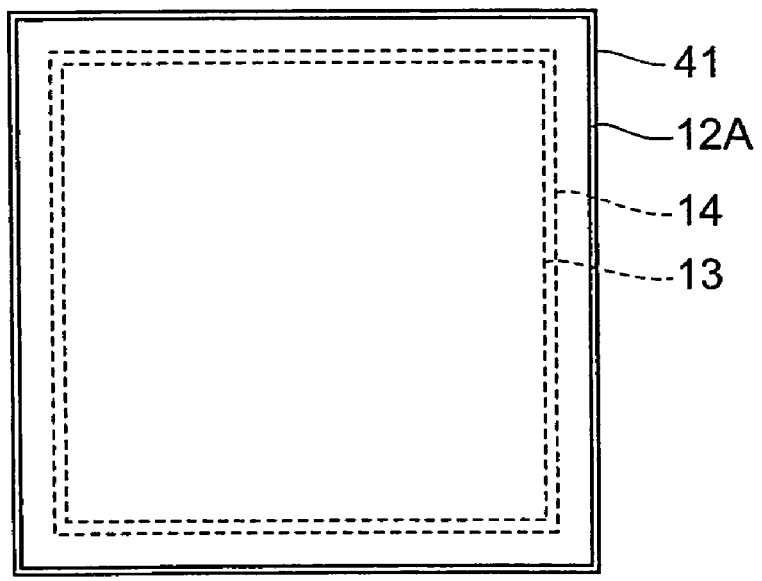
FIG. 23B is a front view thereof.

A ninth embodiment of the present invention shall now be described. FIG. 23A is a sectional view of a radiation detector according to the ninth embodiment of the present invention, and FIG. 23B is a front view thereof as seen from the scintillator side. As shown in FIG. 23A and FIG. 23B, with the radiation detector 52 according to the present embodiment, a surface of scintillator 13, used in manufacturing the scintillator panel of the sixth embodiment (see FIG. 15A and FIG. 15B), is mounted on a solid-state image pickup element. Whereas in the sixth embodiment, scintillator 13, shown in FIG. 17, is covered by organic film 14 and mounted on substrate 11, here, scintillator 13 is mounted onto the light receiving surface of solid-state image pickup element 41 via organic film 14. Although in this mode, solid-state image pickup element 41 is mounted at the opposite side of scintillator forming portion 12A, since scintillator forming portion 12A is not very thick, a mode, wherein the scintillator forming portion 12A side is mounted on the light receiving surface of solid-state image pickup element 41 is also possible.

Figure 24A:
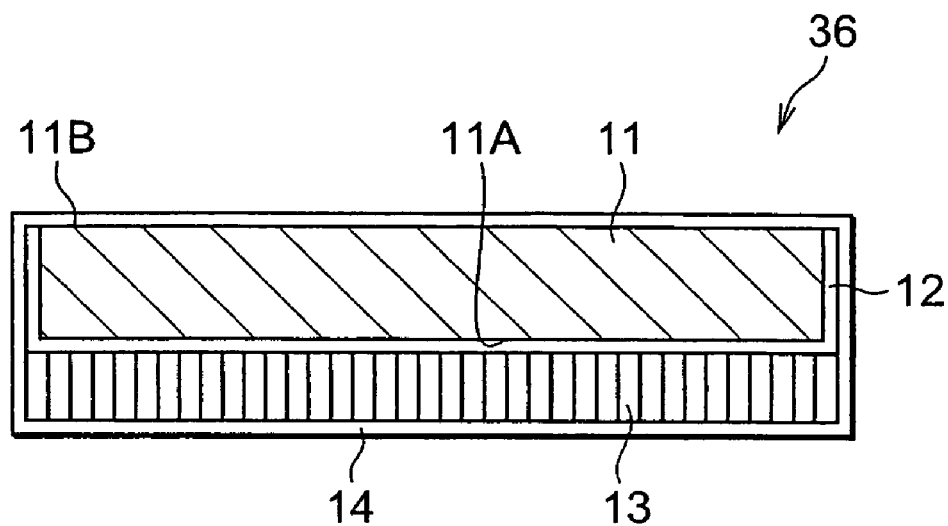
FIG. 24A is a sectional arrangement diagram of a scintillator panel manufactured by a manufacturing method according to a tenth embodiment of this invention.
Figure 24B:
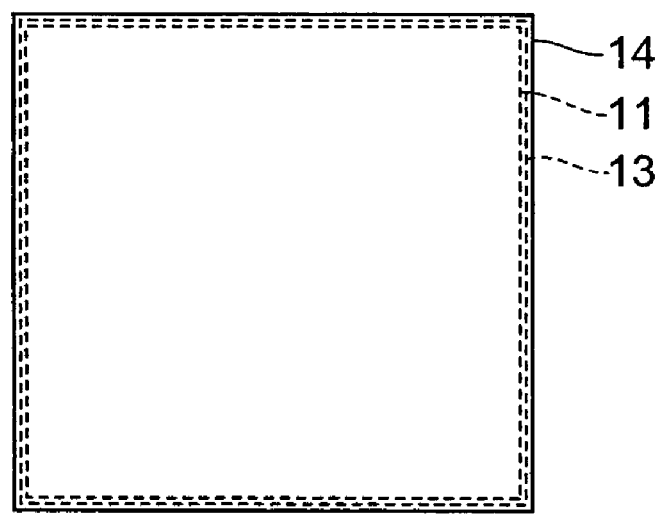
FIG. 24B is a front view thereof.

A tenth embodiment of the present invention shall now be described. FIG. 24A is a sectional arrangement diagram of a scintillator panel manufactured by a manufacturing method of this embodiment, and FIG. 24B is a front view thereof as seen from the substrate 11 side. Although this scintillator panel 36 has the same arrangement as that of the first embodiment, it differs in that scintillator 13 is formed across substantially the entire scintillator forming surface. Incident radiation can thus be converted to visible light, etc., across the entire surface of substrate 11.

Figure 25A:
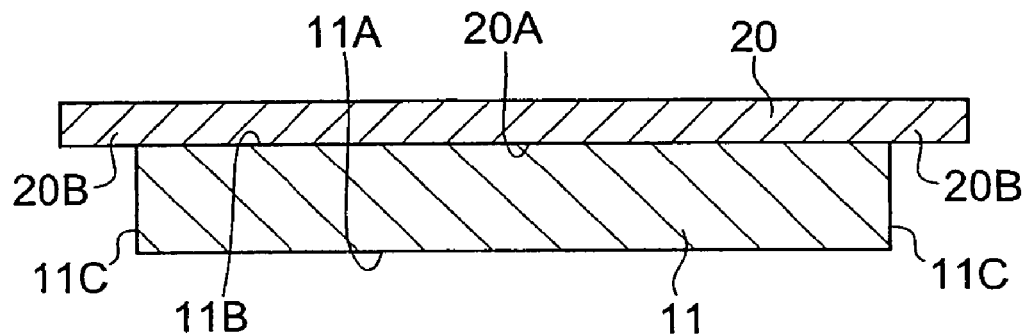
FIG. 25A to FIG. 29 (FIG. 25A, FIG. 25B, FIG. 26A, FIG. 26B, FIG. 27A, FIG. 27B, FIG. 28, and FIG. 29) are diagrams for describing this scintillator panel manufacturing method according to the tenth embodiment.
Figure 25B:
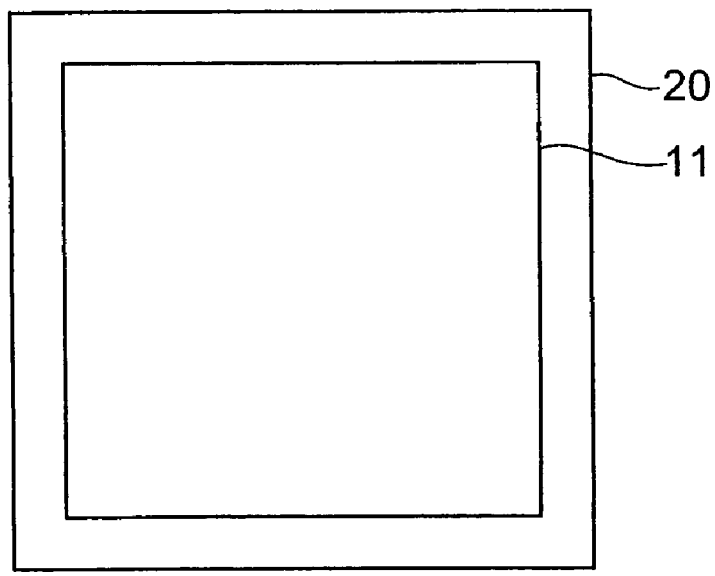

The process for manufacturing this scintillator panel 36 shall now be described with reference to FIG. 25A to FIG. 29. In manufacturing this scintillator panel 36, a support substrate 20, shown in FIG. 25A and FIG. 25B, is used as auxiliary substrate. First, as shown in FIG. 25A and FIG. 25B, substrate 11 is prepared, and upon making a first surface 11B of substrate 11 contact one surface 20A of support substrate 20, substrate 11 and support substrate 20 are overlapped. As shown in FIG. 25B, as support substrate 20, a substrate, which is thinner than substrate 11 and larger in area than substrate 11 in plan view, is used, and side portion 20B, which becomes a protruding portion of support substrate 20, protrudes further to the sides than outer peripheral edges 11C of substrate 11.

Figure 26A:
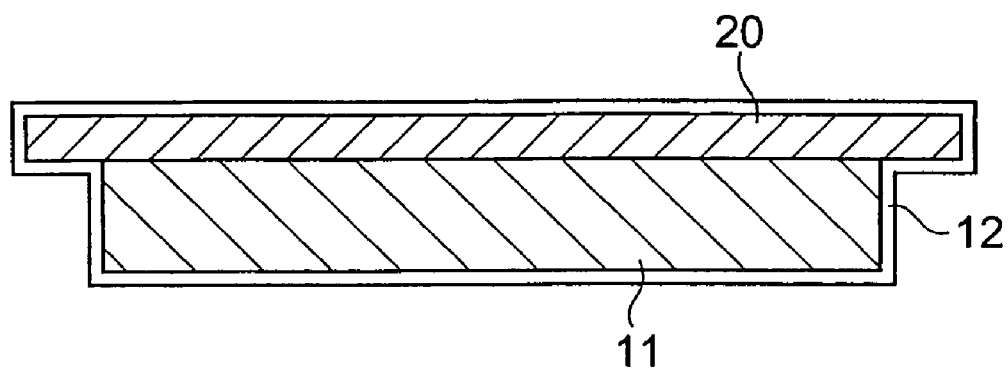
Figure 26B:
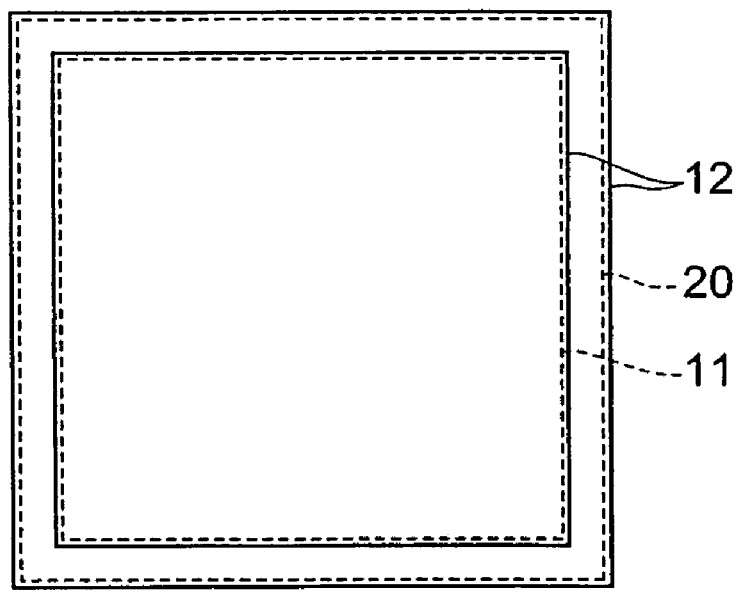

After substrate 11 and support substrate 20 have been overlapped, organic film 12, which covers the entire substrate 11 and support substrate 20, is formed as shown in FIG. 26A and FIG. 26B. Organic film 12 is formed by placing substrate 11 in a CVD device not shown in the figure and performing CVD inside the CVD device. By forming organic film 12 that covers substrate 11 and support substrate 20 in the state in which these are overlapped, substrate 11 and support substrate 20 are maintained in a closely-contacting, overlapped state without being adhered together, etc.

Figure 27A:
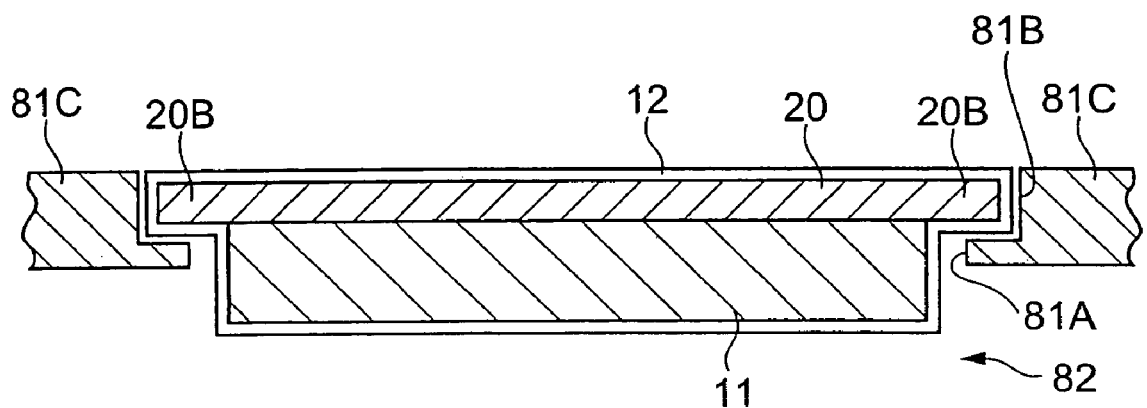
Figure 27B:
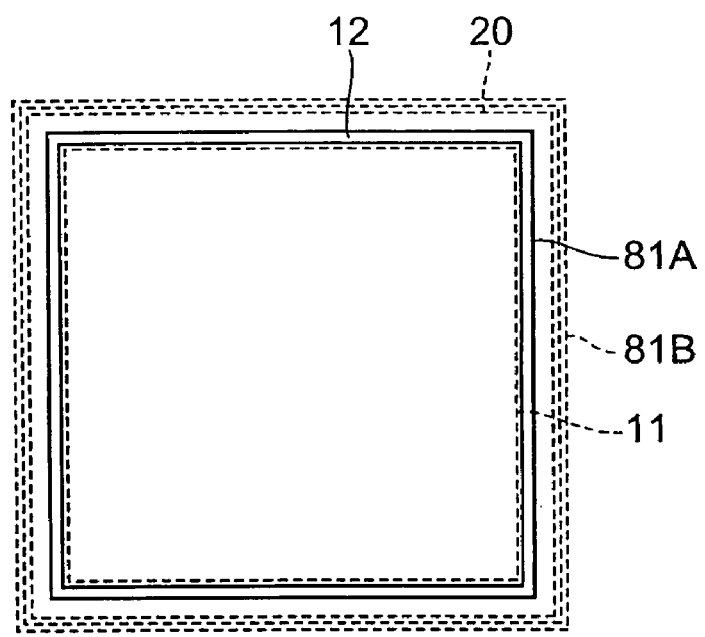
Figure 28:
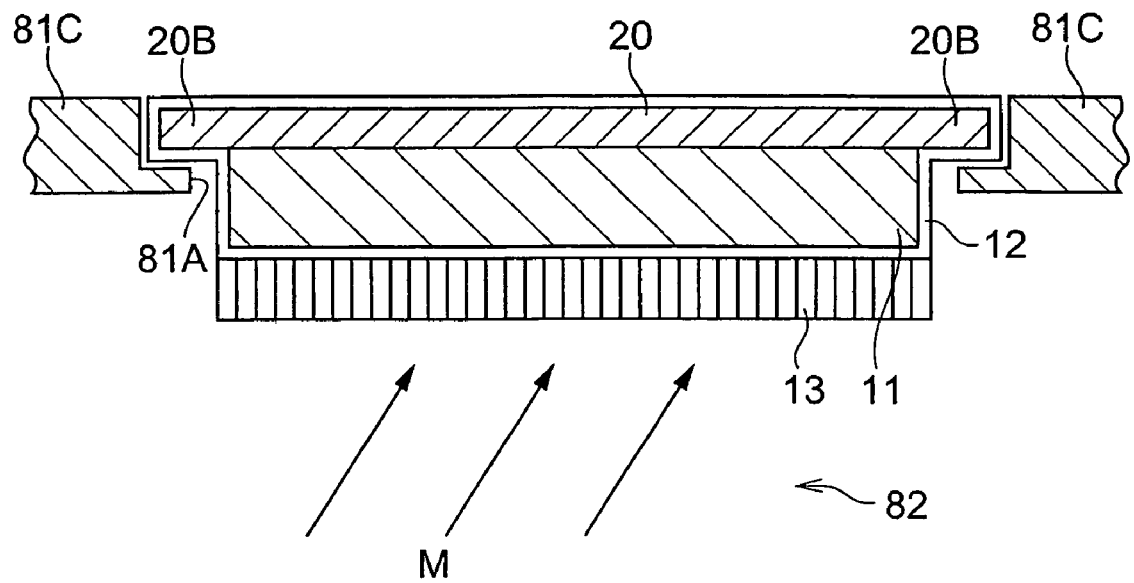

When organic film 12 has been formed with substrate 11 and support substrate 20 being in an overlapped state, these are inserted inside vacuum vapor deposition device 80. Inside vacuum vapor deposition device 80 is positioned a holding jig 81C, which is shown in FIG. 27A. Side portion 20B of support substrate 20 is mounted on this holding jig 81C. Here, by positioning substrate 11 at the lower side of support substrate 20, a state wherein substrate 11 is suspended from support substrate 20 is realized. Substrate 11 is thereby held by holding jig 81C of vacuum vapor deposition device 80. The surface of substrate 11 that is covered by organic film 12 is thus positioned so as to protrude from an opening 81A of holding jig 81C into vapor deposition chamber 82 of vacuum vapor deposition device 80.

When substrate 11 is held by holding jig 81C, scintillator materials M are supplied into vapor deposition chamber 80 below substrate 11 and grown (deposited) by vapor deposition on the surface of substrate 11 to form scintillator 13. Here, the surface of organic film 12 corresponding to one surface 11A of substrate 11 does not contact holding jig 81C and is exposed across the entire surface as mentioned above. Scintillator materials M are thus vapor deposited across the entirety of the surface of organic film 12 that corresponds to substrate 11. As a result, scintillator 13 can be formed across the entire surface of organic film 12 that corresponds to substrate 11. Also, end portions of the surface of organic film 12 that corresponds to substrate 11 are not held by holding jig 81C. The end portions of scintillator 13 will thus be substantially perpendicular to this surface and the end portions of scintillator 13 will not take on a sloped form.

Figure 29:
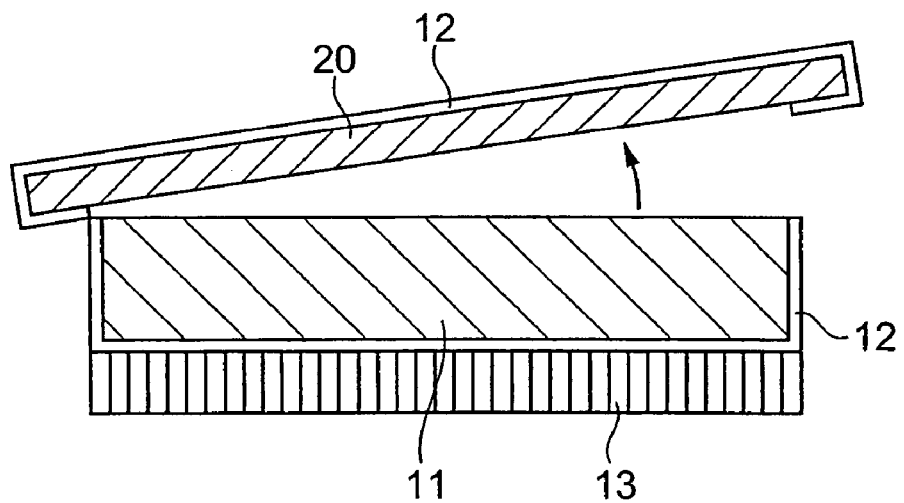

After scintillator 13 has thus been formed, substrate 11 and support substrate 20, covered by organic film 12, are removed from holding jig 81C and taken outside vacuum vapor deposition device 80. Thereafter, the portions of organic film 12 near the portion of overlap of substrate 11 and support substrate 12 are cut as shown in FIG. 29. When organic film 12 is cut across the entire periphery of the portion of overlap of substrate 11 and support substrate 12, substrate 11 and support substrate 20 are freed from the state of being overlapped. Here, since support substrate 20 is simply overlapped onto substrate 11, support substrate 20 is removed as it is from substrate 11 by the cutting of organic film 12.

After substrate 11 has been removed from support substrate 20, protective film 14 is formed so as to cover substrate 11, the remaining organic film 12, and scintillator 13 as shown in FIG. 24A and FIG. 24B. As with the above-described organic film 12, protective film 14 is formed by CVD using the CVD device. By forming this protective film 14 continuously across portions of scintillator 13 to portions of substrate 11, contact of scintillator 13 with external air is prevented.

Scintillator panel 36 is thus manufactured. In forming scintillator 13 on substrate 11 in this manufacturing process, the surface of organic film 12 corresponding to substrate 11 does not contact the holding jig of the vacuum vapor deposition device and this surface can be put in a completely exposed state. Scintillator 13 can thus be formed across the entirety of the surface of organic film 12 that corresponds to substrate 11. This can be used especially favorably in a scintillator panel for dentistry, with which the acquiring of images of as wide a range as possible with a small substrate is demanded since the scintillator panel is inserted inside an oral cavity.

Also, since the end portions of scintillator 13 are made substantially perpendicular to the surface thereof and will not be sloped, in adhering the image pickup element via organic film 12 onto scintillator 13 by an adhesive agent, the concentrating of the adhesive agent and distortion in the process of solidification of the adhesive agent can be prevented.

Figure 30A:
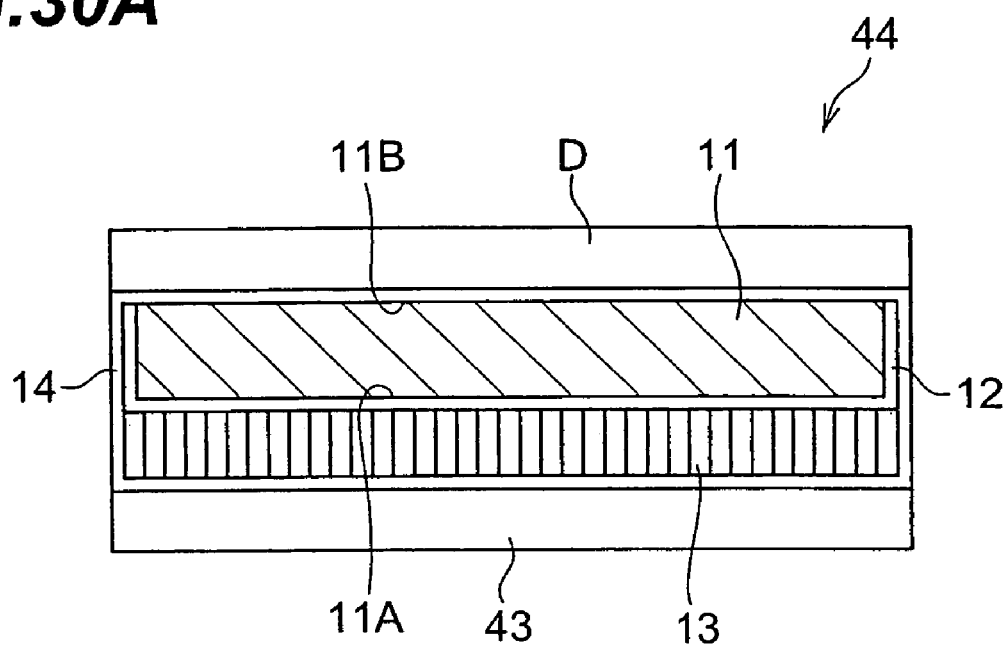
FIG. 30A is a sectional view of a radiation image sensor using the scintillator panel of FIG. 24A

The results of an experiment performed to confirm the effects of scintillator panel 36 of the present embodiment shall now be described. In order to confirm the effects of scintillator panel 36 of the present embodiment, the present inventors conducted the following experiment. As shown in FIG. 30A, a radiation image sensor 44, wherein an image pickup element 43, comprising a CCD, is mounted on the one surface 11A side of scintillator panel 36 of the above-described embodiment, was manufactured. An object D to be detected of substantially the same area as substrate 11 was positioned at the other surface 11B side of substrate 11 of this radiation image sensor 44, X-rays were made incident on detection object D, and an image of detection object D was taken by image pickup element 43.

Figure 30B:
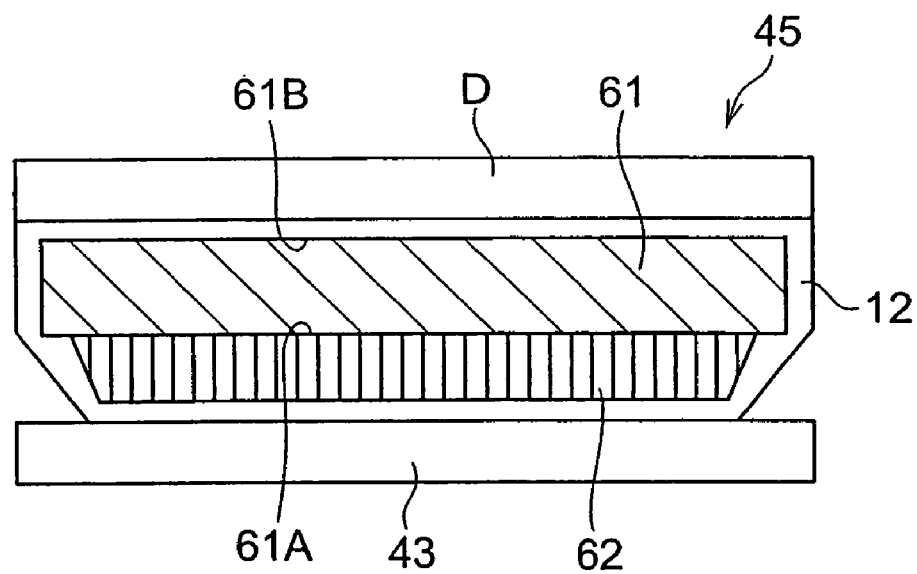
FIG. 30B is a sectional view of a corresponding radiation image sensor manufactured by the conventional manufacturing method.
Figure 38A:
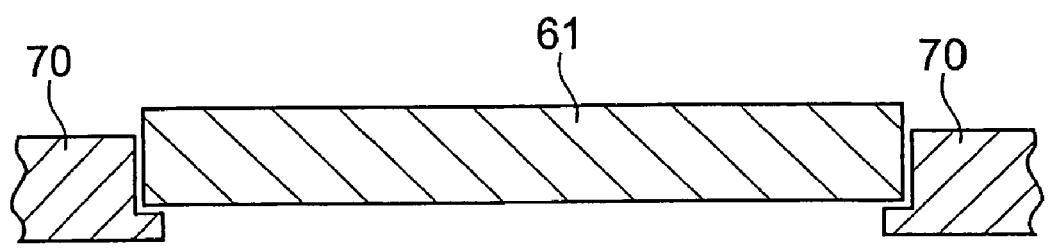
FIG. 38A is a sectional view showing a portion of a conventional scintillator panel manufacturing process and FIG. 38B is a sectional view of the conventional scintillator panel.
Figure 38B:
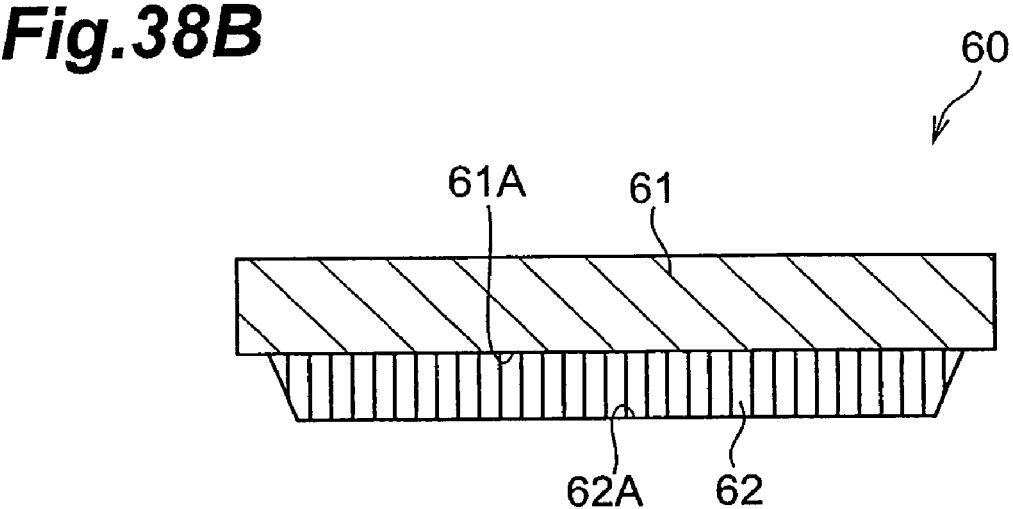

Meanwhile, as a comparative example, conventional scintillator panel 60, shown in FIG. 38B, was covered with an organic film 12 and a radiation image sensor 45, wherein image pickup element 43, comprising a CCD, is mounted on the one surface (scintillator vapor deposition surface) 61A side of substrate 61, was manufactured as shown in FIG. 30B. Detection object D was positioned at the other surface 61B side at the side opposite one surface (scintillator vapor deposition surface) 61A side of substrate 61 of this radiation image sensor 45, X-rays were made incident on detection object D, and an image of detection object D was taken by image pickup element 43. Schematic views of the image taken by the respective image pickup elements 43 are shown in FIG. 31A and FIG. 31B, respectively.

Figure 31A:
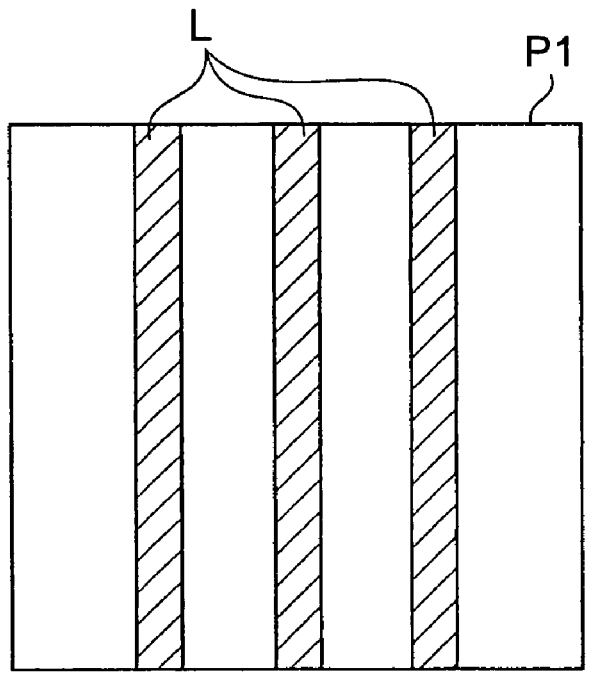
FIG. 31A and FIG. 31B are schematic diagrams showing radiation images obtained by the radiation image sensors of FIG. 30A and FIG. 30B, respectively.
Figure 31B:
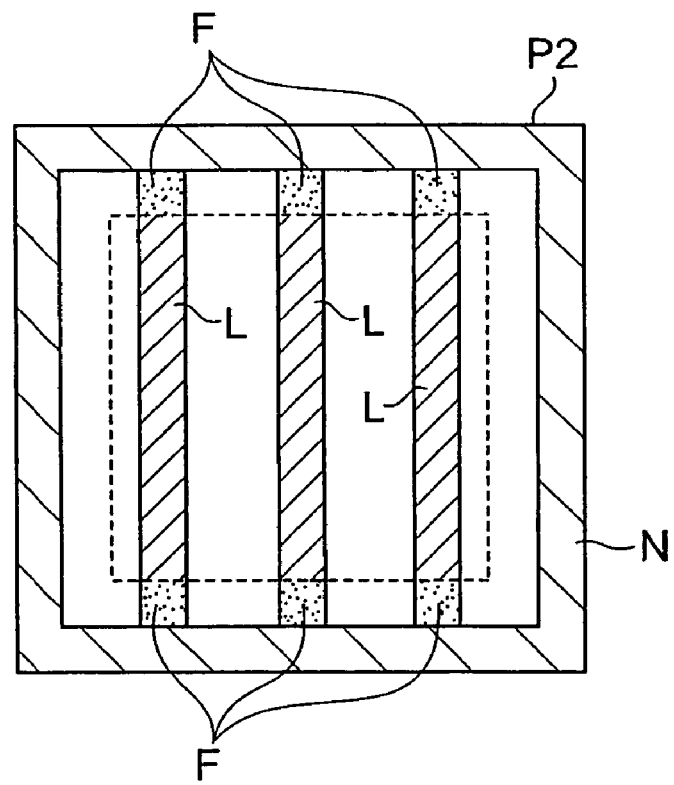

As can be understood from FIG. 31A, with image P1, taken by radiation image sensor 44 using scintillator panel 36 of the present embodiment, three dense lines L appeared clearly. On the other hand, with image P2, taken by radiation image sensor 45 using conventional scintillator panel 60, three dense lines L, L and L appeared clearly at a central portion, however, portions F, F and F at which these lines are fuzzy, appeared at positions close to the outer frame. These portions were found to be regions of low sensitivity. There was also a portion N along the outer frame at which image taking could not be performed at all. This portion was found to be a non-sensitive region.

Thus with radiation image sensor 44, using scintillator panel 36 of the present embodiment, image taking of a clear image is enabled across the entire substrate in comparison to radiation image sensor 45, using conventional scintillator panel 60.

Figure 32:
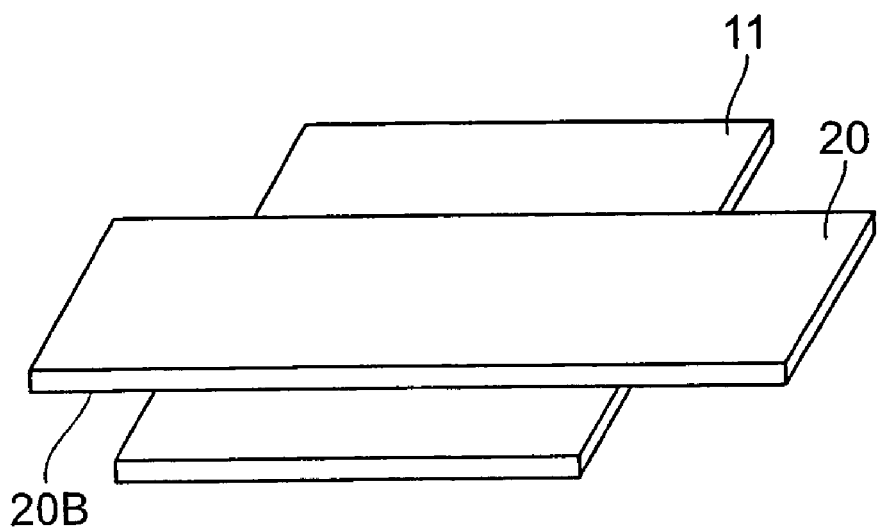
FIG. 32, FIG. 33, FIG. 34A, and FIG. 34B are perspective views for describing other forms of a support substrate.

Although in the above description, a plate that is wider than the substrate in both the longitudinal and lateral directions is used as the support substrate, by using a substrate 20, which protrudes from substrate 11 in at least one direction as shown in FIG. 32, substrate 11 can be supported in a suspended manner inside vapor deposition device 80 using protruding portions 20B. Although a rectangular plate is used here, a support substrate of H-like shape or ladder shape may be used instead.

Figure 33:
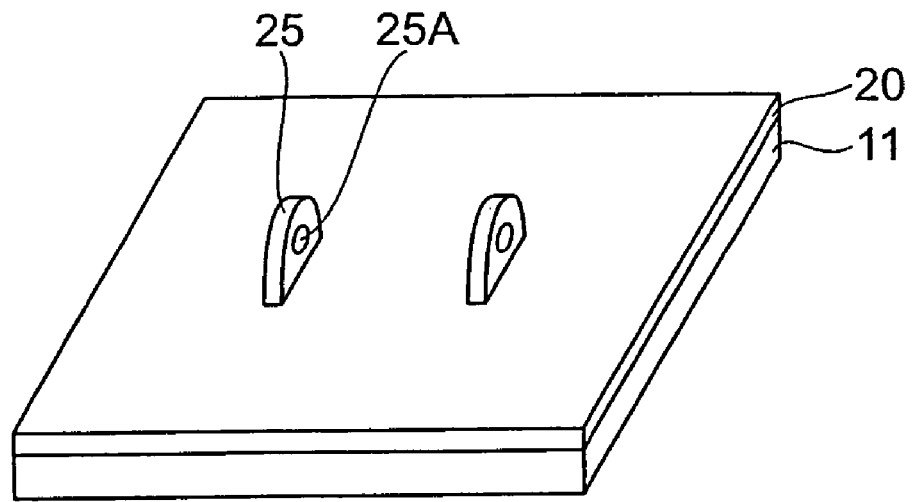

Also, the protruding portions are not limited to those of a horizontal direction, and for example as shown in FIG. 33, protruding portions 25, which protrude from the surface of support substrate at the opposite side of substrate 11 and in the opposite direction of substrate 11, may be provided instead. In this case, holding portions 25A are provided in protruding portions 25 and substrate 11 is supported in a suspended manner inside vapor deposition device 80 using these holding portions 25A.

Figure 34A:
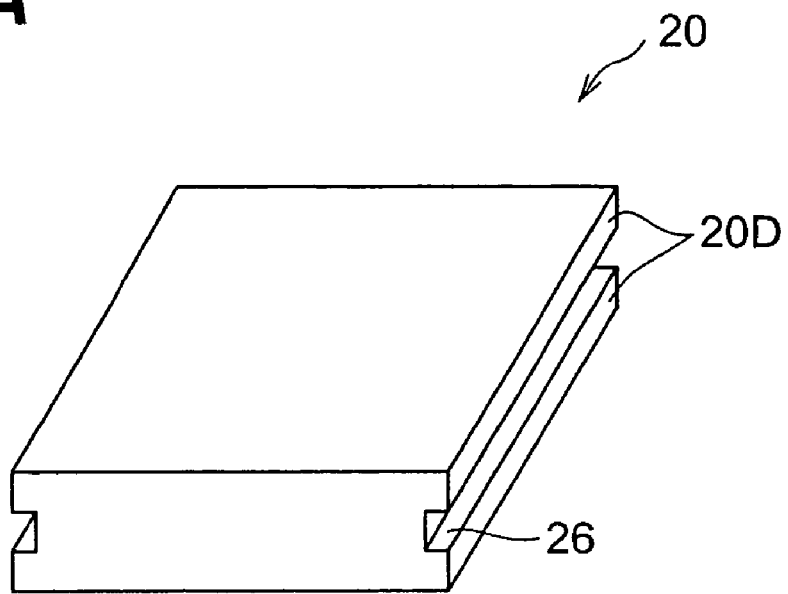
Figure 34B:
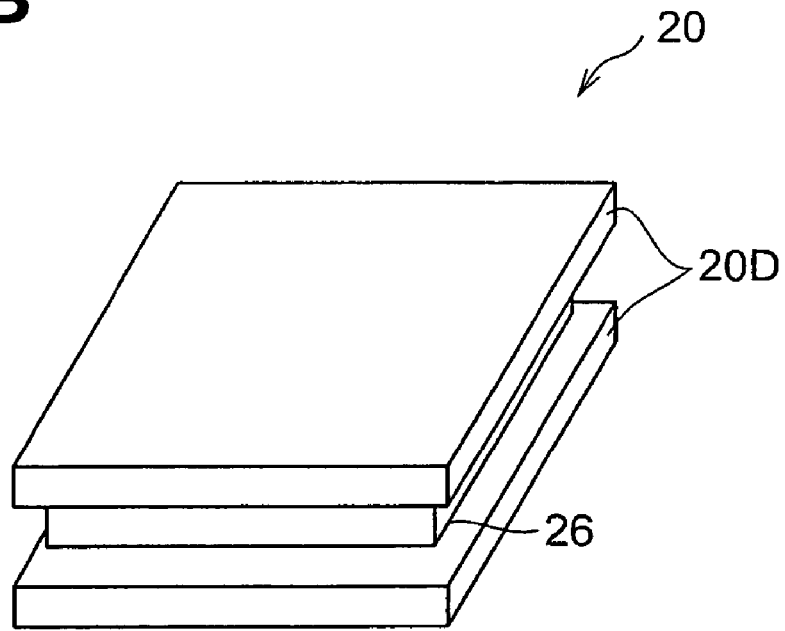
Figure 35:
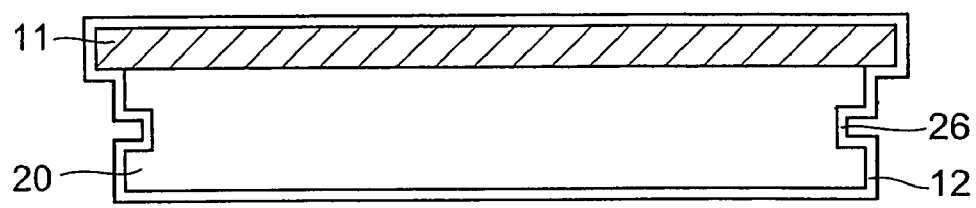
FIG. 35 and FIG. 36 are explanatory diagrams showing portions of a process of manufacturing a scintillator panel using the support substrate shown in FIG. 34A.
Figure 36:
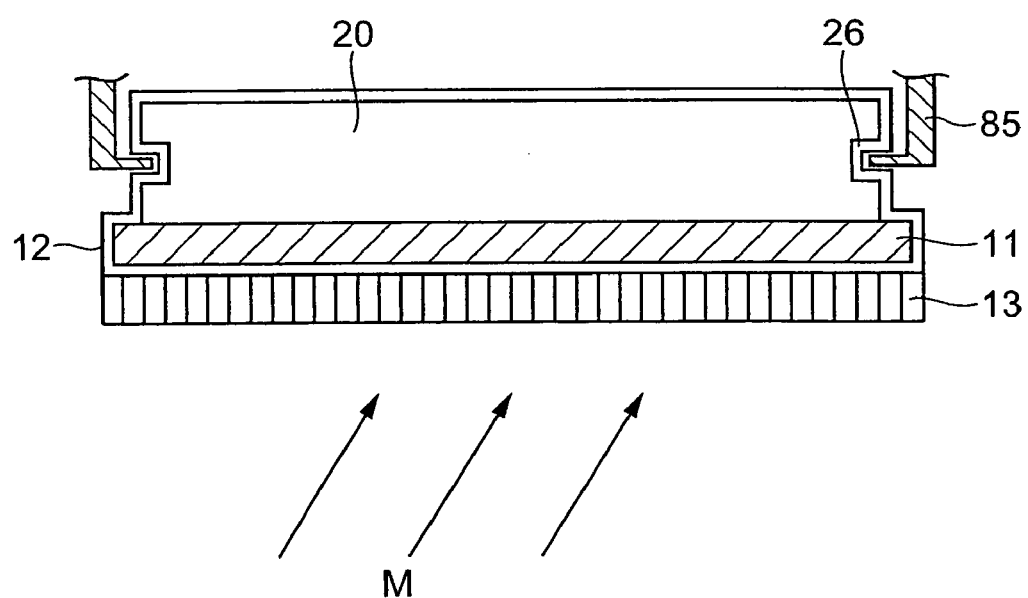

Furthermore, a support substrate that does not have protruding portions may be used. That is for example, a supporting substrate 20, with a shape having grooves 26, which are parallel to the surface, formed in opposing portions of side wall portion 20D as shown in FIG. 34A, or having parallel grooves 26 parallel to the surface in all four surfaces of side wall portion 20D as shown in FIG. 34B, may be used.

In using support substrate 20, shown in FIG. 34, after overlapping this support substrate 20 with substrate 11, the two components are put in close contact by covering its entirety with organic film 12.

In this state, grooves (engaging portions) 26 are engaged with and held by a holding jig 85 to hold substrate 11 in a suspended manner inside vapor deposition device 80, and then scintillator 13 is formed on the surface of substrate 11 that is covered by organic film 12. After forming of the scintillator, by cutting organic film 12 to separate support substrate 20 and covering with protective film 14, scintillator panel 36, shown in FIG. 24A and FIG. 24B, is obtained.

Figure 37A:
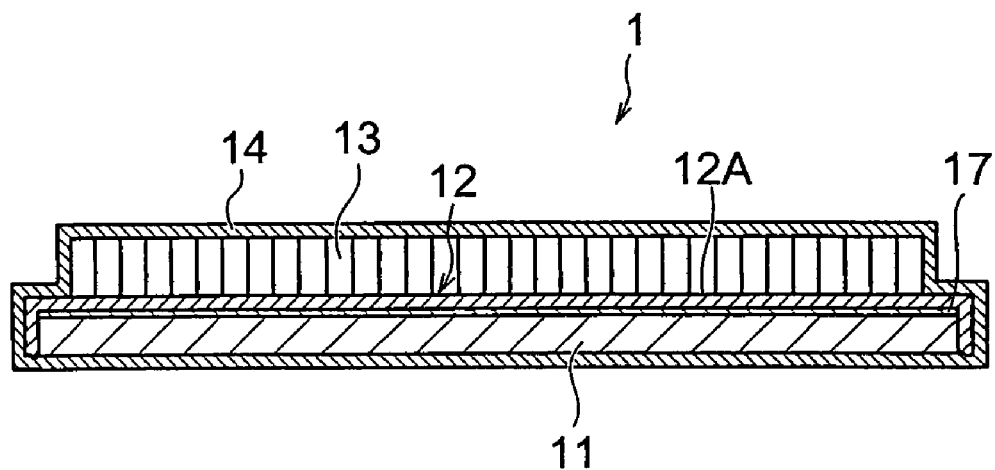
FIG. 37A and FIG. 37B are sectional views showing modification examples of the first embodiment.

Although preferred embodiments of the present invention have been described above, this invention is not limited to the above-described embodiments. For example, although in each of the above-described embodiments, organic film 12 is formed directly on substrate 11 (scintillator forming portion 12A), a mode, wherein a metal reflecting film 17 of the form of a thin film is formed between substrate 11 and organic film 12 is also possible (see FIG. 37A). By forming this metal reflecting film 17, the luminance of the light emitted from the scintillator can be increased. Metal reflecting film 17 may be formed by vapor deposition on one surface of substrate 11 prior to the forming of organic film 12 on the surface of substrate 11. Metals of various types can be cited as the metal to be used as metal reflecting film 17 and, for example, a material containing a substance among the group consisting of Al, Ag, Cr, Cu, Ni, Ti, Mg, Rh, Pt, and Au may be used.

Figure 37B:
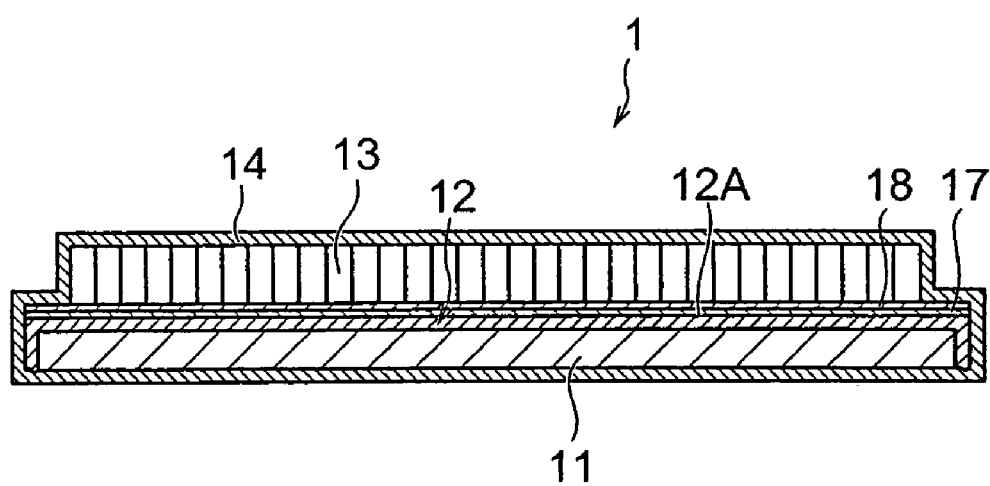

Besides being formed between substrate 11 and organic film 12, metal reflecting film 17 may be formed between organic film 12 and scintillator 13. When metal reflecting film 17 is to be formed between organic film 12 and scintillator 13, it can be formed by covering the surface of substrate 11 with organic film 12 and thereafter vapor depositing the metal onto the surface of organic film 12. A material containing a metal substance in the list given above may be used in this metal reflecting film 17 as well. Also, when metal reflecting film 17 is formed between organic film 12 and scintillator 13, since metal reflecting film 17 and scintillator 13 contact each other and metal reflecting film 17 may degrade due to the minute amount of water contained in scintillator 13, a waterproofing film 18 may be formed between metal reflecting film 17 and scintillator 13 to prevent this degradation (see FIG. 37B). As waterproofing film 18, material of the same substance as organic film 12 may be used. Also, an oxide film may be formed on metal reflecting film and this may be used as waterproofing film 18.

With respect to the scintillator, metal reflecting film 17 is positioned in the direction opposite the direction in which the scintillator emission is taken out.

Furthermore, although in the respective embodiments described above, a radiation transmitting substrate is used as substrate 11, a fiber-optic plate (FOP), which is a plate-like image transmitting body comprising a plurality of optical fibers, may be used in place of the radiation transmitting substrate.

Also in regard to the radiation image sensor, modes wherein the image pickup element is mounted on the scintillator were described, a mode wherein the image pickup element is mounted on substrate 11 is also possible if the substrate transmits light of the emission wavelength of the scintillator as in the case of glass or FOP. A mode, wherein a radiation image sensor is arranged by mounting the image pickup element to the scintillator panel as manufactured by any of the above-described embodiments, is also possible.

Furthermore, although for each of the above-described embodiments, the cut portions of the organic film (scintillator forming portion), the protective film, etc., are illustrated in the cut state, these cut portions may be smoothened, for example, by polishing. Especially in the case of manufacturing a radiation detector, polishing, etc., is preferably applied to make these cut portions smooth.

Also, although in the embodiments described above, CsI (Tl) is used as the scintillator, this invention is not limited thereto, and for example, CsI(Na), NaI(Tl), LiI(Eu), Ki(Tl), etc., may be used instead.

INDUSTRIAL APPLICABILITY

This invention is favorable for manufacturing radiation image sensors and scintillator panels for radiation imaging that are large in area or are thin and, for example, is favorable for manufacturing radiation image sensors and scintillator panels to be used in industrial and medical fields.

The invention claimed is:

1. A manufacturing method of a scintillator panel, wherein a scintillator is vapor deposited onto a substrate, comprising the steps of:
   superpositioning an auxiliary substrate onto a predetermined position of a first surface of the substrate;
   collectively covering the entire superpositioned substrate and auxiliary substrate with an organic film;
   holding the substrate and the auxiliary substrate, which are covered by the organic film, by means of a holding portion inside a vapor deposition device;
   vapor depositing the scintillator onto a surface of the organic film that covers a second surface of the substrate at the side opposite the first surface in this state; and
   cutting the organic film at predetermined positions and separating the substrate from the auxiliary substrate to provide a scintillator panel, with which the organic film and the scintillator are formed on the second surface of the substrate.

2. A manufacturing method of a scintillator panel, wherein a scintillator is vapor deposited onto an organic film, comprising the steps of:
   covering at least a first surface of a predetermined auxiliary substrate with the organic film;
   holding the auxiliary substrate, covered by the organic film, by means of a holding portion inside a vapor deposition device so that the first surface of the auxiliary substrate is situated so as to be faced down in the vapor deposition device;
   vapor depositing the scintillator onto a predetermined position of an exposed surface of the organic film at the side opposite the surface contacting the first surface of the auxiliary substrate in this state;
   separating the organic film, on which the scintillator is formed, from the auxiliary substrate; and
   covering the scintillator and organic film, now separated from the auxiliary substrate, with a protective film.

3. The manufacturing method of the scintillator panel according to claim 1 or 2, wherein the auxiliary substrate has protruding portions that protrude to the outer sides of the substrate as viewed from the first surface side and is held by the holding portion inside the vapor deposition device by use of these protruding portions.

4. The manufacturing method of the scintillator panel according to claim 1 or 2, wherein the auxiliary substrate has protruding portions that protrude in the thickness direction of the substrate and is held by the holding portion inside the vapor deposition device by use of these protruding portions.

5. The manufacturing method of the scintillator panel according to claim 1 or 2, wherein the auxiliary substrate has engaging portions at side wall portions and is held by the holding portion inside the vapor deposition device by use of these engaging portions.

6. A manufacturing method for a radiation image sensor comprising the step of mounting the scintillator panel, manufactured by the manufacturing method of claim 1 or 2, onto a light receiving surface of a solid-state image pickup element.

7. A manufacturing method of a scintillator panel wherein a scintillator is vapor deposited onto an organic film, comprising the steps of:
   covering at least a first surface of a predetermined auxiliary substrate with the organic film;
   holding the auxiliary substrate, covered by the organic film, by means of a holding position inside a vapor deposition device so that the first surface of the auxiliary substrate is situated so as to be faced down in the vapor deposition device;
   vapor depositing the scintillator onto a predetermined position of an exposed surface of the organic film at the side opposite the surface contacting the first surface of the auxiliary substrate in this state;
   separating the organic film, on which the scintillator is formed, from the auxiliary substrate; and
   setting and fixing the organic film on another substrate upon making the organic film surface, which was in contact with the first surface of the auxiliary substrate face the substrate.

8. A manufacturing method of a scintillator panel wherein a scintillator is vapor deposited onto an organic film, comprising the steps of:
   covering at least a first surface of a predetermined auxiliary substrate with the organic film;
   holding the auxiliary substrate, covered by the organic film, by means of a holding position inside a vapor deposition device so that the first surface of the auxiliary substrate is situated so as to be faced down in the vapor deposition device;
   vapor depositing the scintillator onto a predetermined position of an exposed surface of the organic film at the side opposite the surface contacting the first surface of the auxiliary substrate in this state; and setting and fixing the organic film on another substrate upon making the scintillator forming surface of the organic film face the substrate.

9. The manufacturing method of the scintillator panel according to any one of claims 1, 7 and 8, further comprising the step of forming a protective film that covers the scintillator.

10. The manufacturing method of the scintillator panel according to any one of claims 1, 7, and 8, wherein the substrate is a radiation transmitting substrate.

11. The manufacturing method of the scintillator panel according to claim 10, wherein glass, aluminum, or amorphous carbon is used as the radiation transmitting substrate.

12. The manufacturing method of the scintillator panel according to any one of claims 1, 7, and 8, further comprising the step of forming a metal reflecting film between the substrate and the scintillator.

13. The manufacturing method of the scintillator panel according to any one of claims 1, 7, and 8, wherein a fiber-optic plate is used as the substrate.

14. The manufacturing method of the scintillator panel according to claim 7 or 8, further comprising the step of forming a protective film that covers the scintillator after setting and fixing the organic film upon the another substrate.

15. A manufacturing method of a radiation image sensor, having a structure wherein a solid-state image pickup element is mounted on a scintillator formed on a substrate, comprising the steps of:
superpositioning an auxiliary substrate onto a predetermined position of a first surface of the substrate;
collectively covering the entire superpositioned substrate and the auxiliary substrate with an organic film;
holding the substrate and the auxiliary substrate, which are covered by the organic film, by means of a holding portion inside a vapor deposition device;
vapor depositing the scintillator onto a surface of the organic film that covers a second surface of the substrate at the side opposite the first surface in this state;
cutting the organic film at predetermined positions and separating the substrate from the auxiliary substrate to provide a scintillator panel, with which the organic film and the scintillator are formed on the second surface of the substrate; and
adhering the scintillator panel onto a light receiving surface of the solid-state image pickup element.

16. A manufacturing method of a radiation image sensor, having a structure wherein a solid-state image pickup element is mounted on a scintillator formed on a substrate, comprising the steps of:
superpositioning an auxiliary substrate onto a predetermined position of a first surface of the substrate;
collectively covering the entire superpositioned substrate and auxiliary substrate with an organic film;
holding the substrate and the auxiliary substrate, which are covered by the organic film, by means of a holding portion inside a vapor deposition device;
vapor depositing the scintillator onto a surface of the organic film that covers a second surface of the substrate at the side opposite the first surface in this state;
adhering the formed scintillator organic film to the solid-state image pickup element with the scintillator forming surface facing the solid-state image pickup element; and
cutting the organic film at predetermined positions and separating the substrate from the auxiliary substrate to provide a radiation image sensor, having a scintillator panel positioned on the light receiving surface of the solid-state image pickup element.

17. A manufacturing method of a radiation image sensor, having a scintillator layer on a light receiving surface of a solid-state image pickup element, comprising the steps of:
covering at least a first surface of a predetermined auxiliary substrate with an organic film;
holding the auxiliary substrate, covered by the organic film, by means of a holding portion inside a vapor deposition device so that the first surface of the auxiliary substrate is situated so as to be faced down in the vapor deposition device;
vapor depositing the scintillator onto a predetermined position of an exposed surface of the organic film at the side opposite the surface contacting the first surface of the auxiliary substrate in this state;
separating the organic film, on which the scintillator is formed, from the auxiliary substrate; and
adhering the surface at the side opposite the scintillator forming surface of the organic film, having the scintillator, onto the light receiving surface of the solid-state image pickup element.

18. The manufacturing method of the radiation image sensor according to claim 15 or 17, further comprising the step of covering the exposed surface of the scintillator with a protective film.

19. A manufacturing method of a radiation image sensor, having a scintillator layer on a light receiving surface of a solid-state image pickup element, comprising the steps of:
covering at least a first surface of a predetermined auxiliary substrate with an organic film;
holding the auxiliary substrate, covered by the organic film, by means of a holding portion inside a vapor deposition device so that the first surface of the auxiliary substrate is situated so as to be faced down in the vapor deposition device;
vapor depositing the scintillator onto a predetermined position of an exposed surface of the organic film at the side opposite the surface contacting the first surface of the auxiliary substrate in this state;
separating the organic film, on which the scintillator is formed, from the auxiliary substrate; and
adhering the formed scintillator organic film to the solid-state image pickup element with the scintillator forming surface facing scintillator, the solid-state image pickup element.

* * * * *